(12) United States Patent
Kaneko et al.

(10) Patent No.: US 6,428,379 B2
(45) Date of Patent: Aug. 6, 2002

(54) METHOD FOR MANUFACTURING HIGH-PRESSURE DISCHARGE LAMP

(75) Inventors: Yuriko Kaneko, Nara; Makoto Horiuchi, Sakurai; Mamoru Takeda, Soraku-gun, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/814,967

(22) Filed: Mar. 23, 2001

Related U.S. Application Data

(62) Division of application No. 09/145,020, filed on Sep. 1, 1998, now Pat. No. 6,232,719.

(30) Foreign Application Priority Data

Sep. 19, 1997 (JP) ................................. 9-254538
Sep. 25, 1997 (JP) ................................. 9-259616

(51) Int. Cl.[7] .................................................... H01J 9/26
(52) U.S. Cl. ............................................. 445/26; 445/43
(58) Field of Search ...................................... 445/26, 43

(56) References Cited

U.S. PATENT DOCUMENTS

| 4,282,395 A | 8/1981 | Hagemann |
| 4,475,061 A | 10/1984 | van de Weijer et al. |
| 4,892,498 A | 1/1990 | Gradl et al. |
| 5,374,872 A | 12/1994 | Balaschak et al. |
| 5,446,341 A | 8/1995 | Hofmann et al. |
| 5,468,168 A | * 11/1995 | Balaschak et al. ............ 445/26 |
| 5,552,670 A | * 9/1996 | Heider et al. ................. 445/26 |
| 5,557,169 A | 9/1996 | Van Lierop et al. |

FOREIGN PATENT DOCUMENTS

| EP | 0 410 512 | 1/1991 |
| GB | 2 064 216 | 6/1981 |
| JP | 62-115644 | 5/1987 |
| JP | 63-080461 | 4/1988 |
| JP | 5-290810 | 11/1993 |
| JP | 6-208831 | 7/1994 |
| JP | 06-223783 | 8/1994 |
| JP | 6-231730 | 8/1994 |
| JP | 09-045287 | 2/1997 |

* cited by examiner

*Primary Examiner*—Kenneth J. Ramsey
(74) *Attorney, Agent, or Firm*—Wenderoth, Lind & Ponack, L.L.P.

(57) ABSTRACT

A high-pressure discharge lamp includes a glass housing made of a high-melting vitreous material, a pair of sealing components made of the same high-melting vitreous material and extended from the glass housing. A rare gas and a material that is solid or liquid at room temperature is sealed inside the glass housing. Electrically conductive bars are embedded in the sealing components. The air-tight seals around the electrically conductive bars are formed such that at least one metal material selected from metals and oxides of said metals is provided near the regions lying between the high-melting vitreous material and the electrically conductive bar.

11 Claims, 27 Drawing Sheets

PRIOR ART

NONADHESIVE AREA

PRIOR ART

METHOD FOR MANUFACTURING HIGH-PRESSURE DISCHARGE LAMP

The present applications a divisional of U.S. application Ser. No. 09/145,020, filed on Sep. 1, 1998, now U.S. Pat. No. 6,232,719.

BACKGROUND OF THE INVENTION

1. Field of the Invention

The present invention relates to a high-pressure discharge lamp, and more particularly to a sealed structure for a high-pressure discharge lamp, and to a method for manufacturing the same.

2. Description of the Related Art

Liquid-crystal projector devices and the like have recently been adopted as means for magnifying, projecting, and displaying characters, patterns, and other images. High-brightness, high-pressure discharge lamps are commonly used on a wide scale as light sources because such image projection devices require a certain light output. Such lamps are commonly combined with reflecting mirrors. A need has recently arisen for the distance (arc length) between the electrodes of high-pressure discharge lamps to be reduced in order to increase the light-gathering efficiency of the reflecting mirrors.

Such a reduction in the interelectrode distance, however, is tied to a drop in lamp voltage, resulting in increased lamp current if the goal is to retain the same lamp power. Increased lamp current leads to increased electrode loss, causes the electrode material to vaporize more vigorously, and promotes premature electrode deterioration, that is, reduces lamp life.

This is the reason that attempts are usually made to increase mercury vapor pressure or the like during lamp operation and to prevent lamp voltage from decreasing (lamp current from increasing) when the interelectrode distance is reduced. An example is the high-pressure mercury lamp disclosed in Japanese Laid-Open Patent Application 2-148561.

The interelectrode distance of the disclosed lamp is 1.2 mm, and the operating pressure reaches about 200 atm when the lamp is lighted at a rated power of 50 W. According to the disclosure, a high lamp voltage (76 V) can be obtained at such a high pressure.

The operating pressure must be sufficiently high in order to obtain an adequate lamp voltage when the interelectrode distance is reduced in such a manner. The lamp must therefore have a sealed structure of sufficiently high pressure resistance capable of withstanding operation at such super-high pressures.

FIG. 39(a) is a diagram showing part of the overall structure of the sealing component of the high-pressure lamp disclosed in Japanese Laid-Open Patent Application 2-148561.

In the drawing, 100 is a roughly spherical light-emitting component made of quartz glass, 101 is a lateral tubular component extending from the light-emitting component 100, and 102 is a tungsten electrode for feeding electric current to the light-emitting component 100. 103 is a molybdenum foil; 104, a molybdenum lead wire for introducing outside current. These components constitute an electrode assembly 105, obtained by connecting the electrode 102 to one end of the molybdenum foil 103 (one end of the electrode extends into the light-emitting component 100), and the electric current feeding lead wire 104 to the other end. The electrode assembly 105 is air-tightly sealed in the lateral tubular component 101 by a sealed foil structure in which the elastic deformation of the molybdenum foil 103 is used for absorbing differences in thermal expansion in relation to the quartz glass.

An effective means capable of withstanding high operating pressures (up to 200 atm) with the aid of such a sealed foil structure is described in detail, for example, in "The 7th International Symposium on the Science & Technology of Light Sources (1995), Symposium Proceedings," 111.

An overview of the above publication will now be given with reference to FIG. 39(b).

FIG. 39(b) is a cross section of area AA' in FIG. 39a. Part of the electrode 102 is embedded in the lateral tubular component 101, and a non-adhesive area 107 is formed around the electrode 102, as shown by the dots in FIG. 37. According to the aforementioned article, if W is the width of the non-adhesive area 107, the resistance of the lamp to high pressure can be improved by reducing the width W of the non-adhesive area 107. Specifically, it is claimed that using a structure of smaller width W makes it possible to reduce pressure concentration in the non-adhesive area 107 and improves the resistance of the lamp to high pressure.

Meanwhile, a sealed rod structure such as that disclosed in U.S. Pat. No. 4,282,395 is a known example of another sealed structure resistant to high pressures. In this structure, as shown in FIG. 40, electrodes 102 are air-tightly sealed in lateral tubular components 101 through the intermediary of glass (for example, superhard glass 200 with a coefficient of expansion of $32 \times 10^{-7}/°$ C.) whose coefficient of thermal expansion lies between that of quartz glass (coefficient of expansion: $5.5 \times 10^{-7}/°$ C.) and that of tungsten (coefficient of expansion: $46 \times 10^{-7}/°$ C.), in areas B of the lateral tubular components 101 at a distance from the light-emitting component 100. The force with which the electrodes 102 and the quartz glass are bonded via the intermediate glass 200 is much greater than the force with which the molybdenum foil and the quartz glass are bonded by the elastic deformation of the molybdenum foil, providing a structure that is superior to a sealed foil structure in terms of resistance to high pressure.

According to the above-described teaching, the maximum withstand pressure of a lamp with a sealed foil structure is limited in terms of the diameter of the electrodes 102 because the diameter of the electrodes 102 is the minimum value of the width W shown in FIG. 39(b). This is the reason that using a sealed foil structure makes it difficult, for example, to construct the lamp of high operating pressure (up to 200 atm) described in Japanese Laid-Open Patent Application 2-148561. as a high-output lamp requiring a large lamp current and a sufficiently thick electrode to accommodate this current. For this reason, all the examples of lamps disclosed in Japanese Laid-Open Patent Application 2-148561 are limited to low-output lamps of 50 W or lower.

The sealed rod structure depicted in FIG. 40 can endow a lamp with higher resistance to high pressure than a sealed foil structure, making it possible to provide a lamp whose output and operating pressure are higher than those of a lamp with a sealed foil structure. The conventional sealed rod structure depicted in FIG. 40 is unsuitable, however, for lamps in which the light-emitting substance consists of mercury or another substance whose vapor pressure varies widely with the lamp temperature during operation, such as the lamps described, for example, in the aforementioned Japanese Laid-Open Patent Application 2-148561.

This is because the maximum service temperature of the intermediate glass used in the sealed rod structure is lower than the normal value of 900° C. (maximum value: 1100° C.) for quartz glass, as typified by the normal value of 230° C. (maximum value: 490° C.) for superhard glass, requiring that, normally, the electrode be air-tightly sealed near the areas B of the low-temperature portion at the maximum distance from the light-emitting component 100, which develops the highest temperature during operation, as shown in FIG. 40.

Because of this, low-temperature regions (gaps where the lateral tubular components 101 are not bonded to the electrodes 102) designated as areas A form in FIG. 40 inside the sealed light-emitting component 100 of a lamp with a sealed rod structure. Consequently, mercury is sealed as a light-emitting substance with the aid of a conventional sealed rod structure inside, for example, the light-emitting component 100, and this mercury condenses in areas A even when the goal is to obtain the mercury lamp of high operating pressure disclosed in Japanese Laid-Open Patent Application 2-148561, making it impossible to obtain the desired mercury vapor pressure or to construct a properly operating lamp. When an attempt is still made to ensure that the lamp operates properly by forming a seal near the connection between the light-emitting component 100 and the lateral tubular components 101, the intermediate glass 200 is exposed to high temperatures and is melted during operation, and the bond is broken and the lamp fractured by the difference in pressure between the high-pressure light-emitting component 100 and the outside, which has roughly atmospheric pressure.

SUMMARY OF THE INVENTION

An object of the present invention is to overcome the above-described shortcomings, to provide a sealed structure for a high-pressure discharge lamp that has excellent resistance to high pressure and is suitable for developing higher-output lamps, and to provide a method for manufacturing a high-pressure discharge lamp with such a sealed structure.

Aimed at attaining the stated object, the high-pressure discharge lamp in accordance with the present invention is characterized by comprising at least a glass housing made of a high-melting vitreous material; sealing components made of the same high-melting vitreous material and extended from the glass housing; a rare gas and a material that is solid or liquid at room temperature, sealed inside the light-emitting component; electrically conductive metal structures partially embedded in the sealing components and designed for feeding electric current to a discharge arc formed inside the light-emitting component; and air-tight seals such that at least one metal material selected from metals and oxides of these metals is provided near the regions lying between the high-melting vitreous material and the electrically conductive metal structures in the sealing components, and that the electrically conductive metal structures are air-tightly sealed within the high-melting vitreous material.

Here, the high-pressure discharge lamp is characterized in that the air-tight seals are formed by distributing a powder of the metal material in the electrically conductive metal structures.

According to another embodiment, the high-pressure discharge lamp is characterized in that the air-tight seals are formed by providing thin films of the metal material to the electrically conductive metal structures.

According to yet another embodiment, the high-pressure discharge lamp is characterized in that the air-tight seals are formed by admixing a powder of the metal material into the sealing components.

An oxidized surface is formed on at least part of the surface of the electrically conductive metal structures.

The air-tight seals provide a sealed structure for a high-pressure discharge lamp that has excellent adhesiveness and resistance to high pressure and that can withstand increases in lamp output.

The method for manufacturing a high-pressure discharge lamp in accordance with the present invention comprises at least the steps of preparing an outer tube made of a high-melting vitreous material and provided with a glass housing and with tubular components extending from the glass housing, and electrically conductive metal structures for supplying electric current in order to form a discharge arc in the glass housing; introducing the electrically conductive metal structures into the tubular components such that one end of each of them is disposed inside the glass housing; applying a least one type of metal material selected from metals or oxides of these metals between the electrically conductive metal structures and the inner surfaces of the tubular components; and heating and collapsing the tubular components to appropriately seal the electrically conductive metal structures.

It is also possible to manufacture a high-pressure discharge lamp with the structure by preparing an outer tube made of a high-melting vitreous material and provided with a glass housing and with tubular components extending from the glass housing, and electrically conductive metal structures for supplying electric current in order to form a discharge arc in the glass housing; applying at least one type of metal powder or metal oxide powder to, or forming thin films of at least one type of metal or metal oxide on, the inner surfaces of the tubular components; then introducing the electrically conductive metal structures into the tubular components such that one end of each of them is disposed inside the glass housing; and heating and collapsing the tubular components to air-tight seal the electrically conductive metal structures.

DESCRIPTION OF THE PREFERRED EMBODIMENTS

Embodiments

Embodiments of the present invention will now be described with reference to drawings.

Embodiment 1

Figure 1:
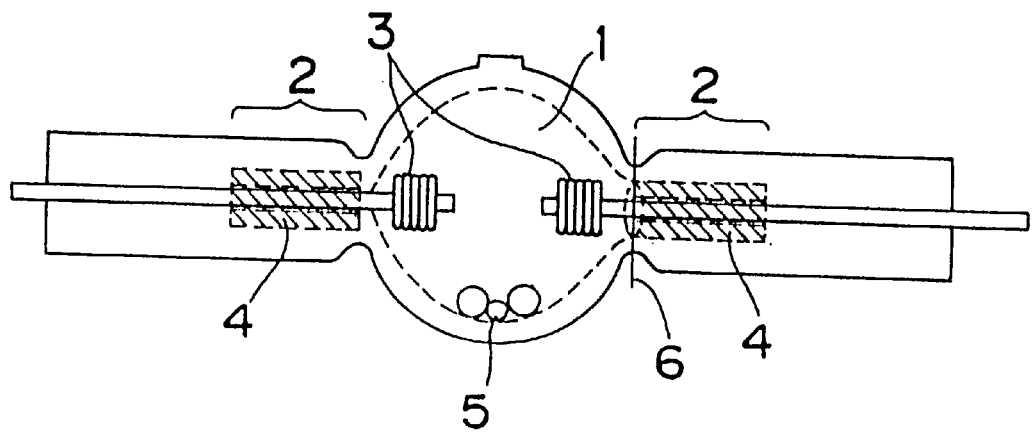
FIG. 1 is a diagram showing a high-pressure discharge lamp constructed in accordance with Embodiment 1 of the present invention.

FIG. 1 is a structural drawing of Embodiment 1 of the high-pressure discharge lamp of the present invention and provided with a sealed structure in which a glass sleeve whose melting point is lower than that of quartz glass is interposed between a discharge electrode bar and the quartz glass for a sealing component. In FIG. 1, 1 is a light-emitting tubular housing or component serving as an outer discharge tube, 2 are electrode-sealing components, 3 are discharge electrode bars, 4 are glass sleeves, 5 are sealed mercury and metal halides, and 6 is the border between the electrode-sealing components and the interior of the light-emitting tube. Quartz glass is used for the light-emitting tubular component 1, and 96% silica glass such as Vycor® manufactured by Corning Inc. is used for the glass sleeves 4. The discharge electrode bars 3 are made of a tungsten material and have a diameter of 0.9 mm. In addition, the volume of the light-emitting tubular component 1 is about 0.45 cc, and the inside diameter 6 of the border between the electrode-sealing components and the interior of the light-emitting tube prior to sealing is 2.0 mm.

A lamp voltage of about 80 V is achieved when the lamp in FIG. 1 containing, in sealed form, 90 mg mercury, 0.4 mg indium iodide, and 1.0 mg thulium iodide (the last two are metal halides) is lighted at a power of 200 W. The corresponding estimated operating pressure is about 200 atm. Surprisingly, the high-pressure discharge lamp of the present invention, which does not have a conventional sealed foil structure or a conventional sealed rod structure, but in which Vycor glass sleeves 4, acting as air-tight sealing components, whose melting point is lower than that of quartz glass are interposed between the discharge electrode bars 3 and the quartz glass 2 of the sealing components, operates normally and can withstand operating pressures as high as about 200 atm, with the sealed light-emitting material or filler vaporizing without migration inside the light-emitting tubular component 1.

The advantages of the sealed structure of the high-pressure discharge lamp described in Embodiment 1 of the present invention may become more apparent from the results of the certification tests described below.

Figure 2:
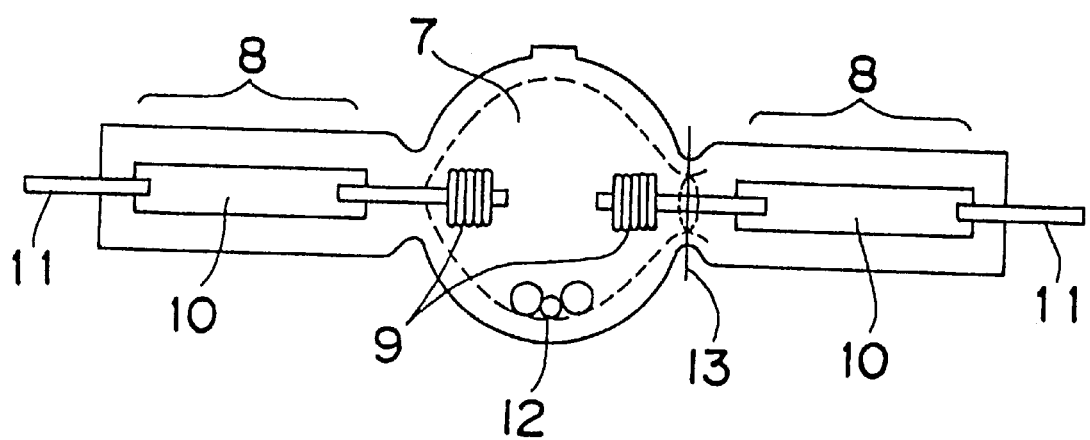
FIG. 2 is a diagram showing a high-pressure discharge lamp having a conventional sealed foil structure.

Here, FIG. 2 is a structural drawing illustrating a sealed, high-pressure discharge lamp obtained using conventional metal foil. 7 is an outer discharge tube, 8 are sealing components, 9 are discharge electrode bars, 10 are metal foils, 11 are leader lines connected to an external drive, 12 are sealed mercury and metal halides, and 13 is the border between the interior of the light-emitting tube and the sealing components. The discharge electrode bars 9 are made of a tungsten material and have a diameter of 0.9 mm. In addition, the inside diameter of the borders 13 between the electrode-sealing components and the interior of the light-emitting tube prior to sealing is 2.0 mm. A molybdenum material is used for the metal foils 10.

Figure 3:
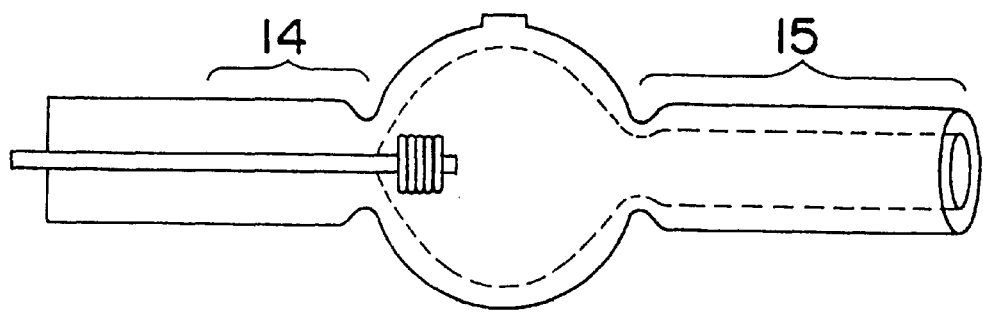
FIG. 3 is a diagram showing a test lamp for measuring lamp air-tightness and withstand pressure.

FIG. 3 is a structural drawing of test lamps for measuring the air-tightness and pressure-tightness of lamps sealed using the above-described structure. 14 is a sealing component, sealed as shown in FIGS. 1 and 2. (FIG. 3 is a representative drawing showing a sealed structure obtained by the sealing method of FIG. 1.) 15 is a component, in the form of an unsealed glass tube, for evacuating the interior of the light-emitting tube.

The measurement lamps of FIG. 3, sealed as shown in FIGS. 1 and 2, were used to conduct observations of the gap in the sealing component. To observe the gap, an ink (New Kokushin, Edible Red No. 102) was injected with a syringe through the component 15 for evacuating the light-emitting tube, ultrasonic vibrations were imparted while the sealed portion was immersed in water to allow the ink to penetrate the small gap, and the lamps were allowed to stand for several hours.

According to the results, no ink penetration was observed in the sealing component of FIG. 1. With the conventionally sealed lamp (lamp in FIG. 2), however, the ink was observed to have penetrated along the electrode bars to the connection between the metal foil and the electrode bars. This indicated that better air-tightness than in the past had been obtained.

In addition, the component 15 for evacuating the light-emitting tube was connected to an evacuation stand, itself connected to a rotary pump and a turbomolecular pump, and vacuum was created in order to measure air-tightness in a similar manner with the aid of the measurement lamps of FIG. 3, sealed as shown in FIGS. 1 and 2. After that, both lamps (FIGS. 1 and 2) were evacuated for several minutes to $2.0*10^{-6}$ atm. This degree of vacuum corresponded to a level sufficient to withstand lamp operation.

The initial withstand voltages of the above-described lamps were subsequently measured. High-pressure gas was introduced through the component 15 for evacuating the light-emitting tube, and the burst pressure thereof was measured. The burst pressure of the lamps was designated as their initial withstand pressure. Since the high-pressure gas used in the tests had a maximum pressure of 200 kg/cm$^2$, higher pressure levels could not be measured. The lamp in FIG. 1 did not burst at 200 kg/cm$^2$.

By contrast, the conventional sealed lamp (lamp in FIG. 2) had an initial withstand pressure of 100–150 kg/cm$^2$. It was thus learned that a sealed structure devoid of metal foil provided a structure of high withstand voltage.

Thus, the high-pressure discharge lamp of the present invention has a sealed structure in which Vycor glass sleeves whose melting point is lower than that of quartz glass are interposed between regions of the discharge electrode bars and the quartz glass of the sealing components, making it possible to provide a highly pressure-tight lamp in which the sealed mercury or metal halides do not condense near the discharge electrode bars of the sealing components.

The same results were obtained when similar experiments were performed on products obtained by packing a glass powder into the gaps between the discharge electrode bars 3 and the glass sleeves 4, admixing metals into the glass powder, or providing the electrode bars 3 with metal films.

When lamps were sealed using the electrode bars 3 and the glass sleeves 4 alone, small gaps sometimes remained between the electrode bars and the glass sleeves following sealing, causing the sealing state to vary from lamp to lamp, whereas this variation disappeared and an even better air-tight seal could be formed when packing was performed using a glass powder or a product obtained by admixing metal into a glass powder.

In addition, differences in the coefficient of thermal expansion between the glass and the electrode bars did not cause any cracking in products obtained by forming metal oxide films on the electrode bars 3 during sealing. Although the reason for this is not entirely clear, it is assumed that the metal oxide films reduce the effect of differences in the coefficient of thermal expansion between the glass and the electrode bars. The absence of cracks during sealing improves air-tightness between the glass and the electrode bars. Another effect, which concerns the dramatic reduction of withstand pressure in comparison with design values due to the formation of large cracks, is that the nonuniformity among lamps can be reduced.

Figure 4:
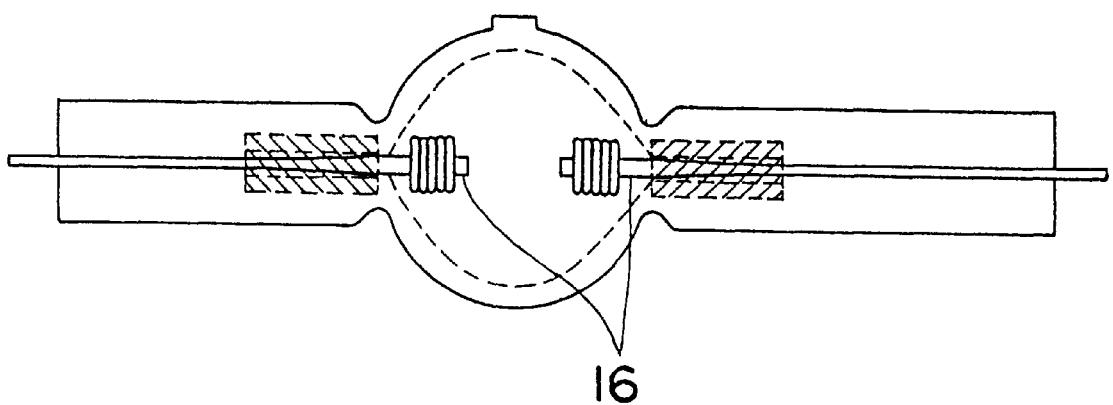
FIG. 4 is a diagram showing a lamp structure in which the cross-sectional surface area perpendicular to the major axes of the electrodes gradually increases in the direction of the area where a discharge arc is generated.

Similar experiments were conducted by forming electrode bars that tapered off in a continuous manner, with their cross-sectional surface area, as measured in a plane perpendicular to the major axes of the electrodes, being 0.9 mm$^2$ on the side where the discharge arc is formed, and 0.05 mm$^2$ on the side (on the other end) where the assembly is electrically connected to an external drive. The resulting lamp is depicted in FIG. 4. It was observed in these experiments that the compressive strain created in the sealing components increased with a reduction in the diameter of the electrode bars 16. These results suggested that a structure of higher withstand pressure was obtained since the compressive strain of a sealing component generally improves withstand pressure.

Embodiment 2

The following is a description of a method for manufacturing the lamp in FIG. 1 described in Embodiment 1.

Figure 5:
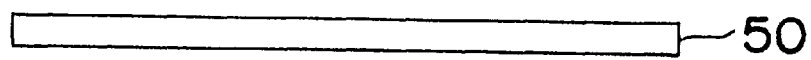
FIG. 5 is a diagram showing the structure of a discharge electrode bar in accordance with Embodiment 2 of the present invention.
Figure 6:
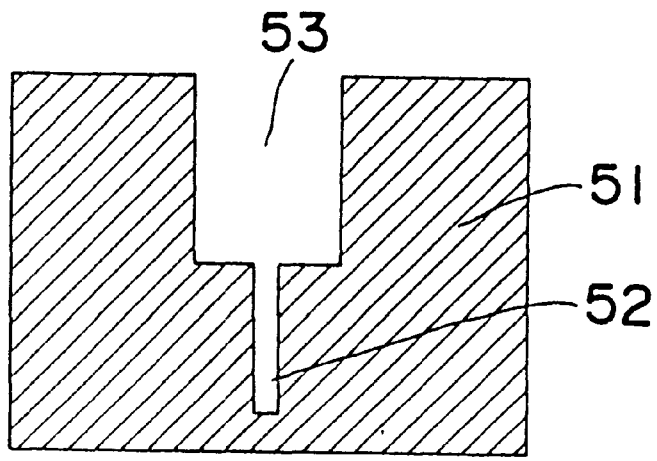
FIG. 6 is a structural diagram of the mold for forming an electrode molding in accordance with Embodiment 2 of the present invention.

FIG. 5 depicts an electrode bar 50. Furthermore, FIG. 6 depicts a mold 51 for forming an electrode-shaped molding. The mold is provided with an opening 52 for putting in the electrode bar 50, and with an opening 53 for inserting a glass sleeve. The opening 52 is formed to a diameter small enough to prevent the electrode bar 50 from leaning sideways during insertion. The depth of the opening 52 must be set in advance because the electrode bar 50 is inserted into the opening 52 on the side where the electrode, after being air-tight-ly sealed inside the lamp, is connected to an external drive through the end of the sealing component. It is apparent that insertion into the opening 52 is also possible on the side where a discharge arc is formed, in which case the depth of the opening 52 must be adjusted and set to match the length of the electrode bar from the sealing component end to the end at which a discharge arc is formed. In addition, the opening 53 for inserting a glass sleeve is formed to a diameter small enough to prevent the glass sleeve from leaning sideways during insertion.

Figure 7:
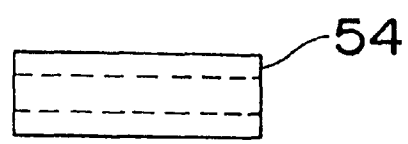
FIG. 7 is a diagram showing the structure of a glass sleeve in accordance with Embodiment 2 of the present invention.

FIG. 7 depicts a glass sleeve for acting as an air-tight sealing component. The glass sleeve is made of a material, in this case Vycor, whose melting point is lower than that of the outer lamp tube. The components are prepared such that the outside diameter of the glass sleeve is less than the inside diameter of the of the tubular component on the lamp side, and the inside diameter of the glass sleeve is greater than the diameter of the electrode bar.

Figure 8:
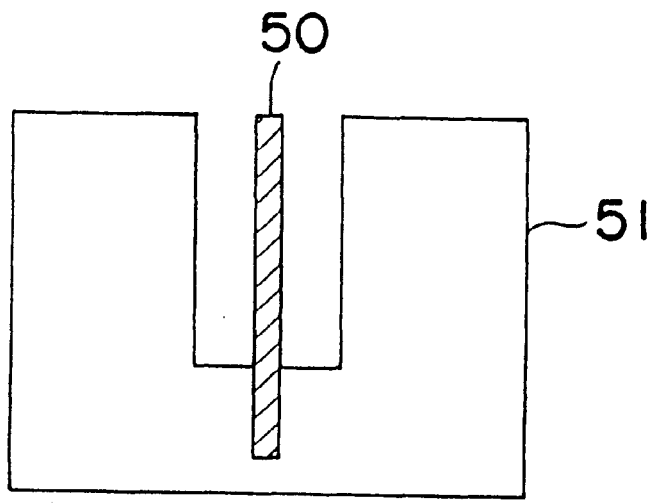
FIG. 8 is a diagram showing the method for manufacturing an electrode molding in accordance with Embodiment 2 of the present invention.
Figure 9:
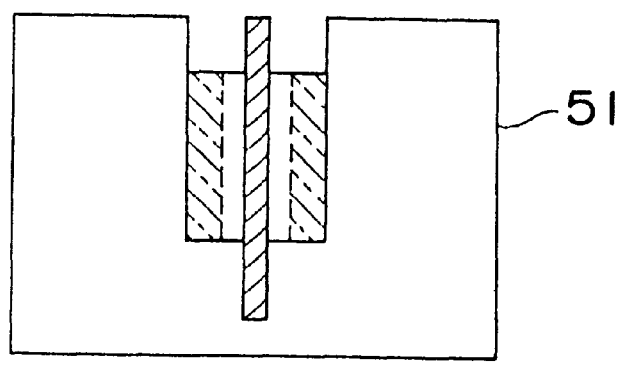
FIG. 9 is a diagram showing a step for manufacturing an electrode molding in accordance with Embodiment 2 of the present invention.

The electrode bar 50 thus prepared is set up in the completed tungsten mold 51 after being inserted as shown in FIG. 8. A glass sleeve 54 is subsequently set up in the mold 51 after being inserted as shown in FIG. 9. The glass sleeve is then filled on the inside with a glass powder (designated as 55 in FIG. 10) prepared from the same material as that of the glass sleeve or from a material whose melting point is lower than that of the glass sleeve.

Figure 10:
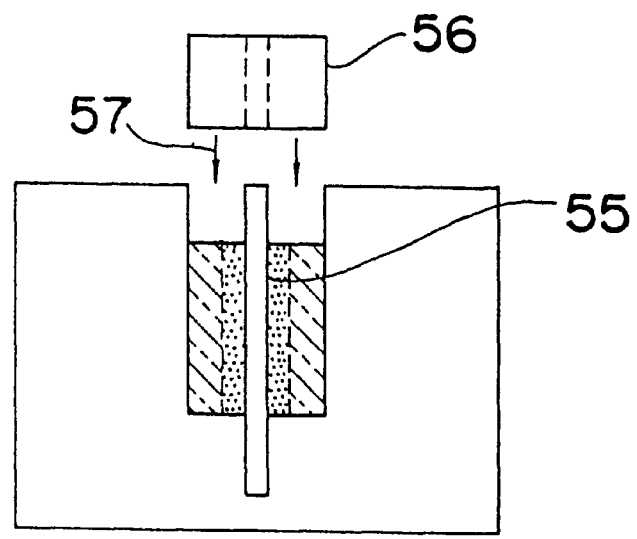
FIG. 10 is a diagram showing the method for manufacturing an electrode molding in accordance with Embodiment 2 of the present invention.

The glass powder 55 is compressed and compacted in the direction of arrow 57 in FIG. 10 with the aid of a doughnut-shaped, compression-forming tool 56 whose outside diameter allows the tool to be tightly inserted into the opening 53 of the mold, and whose inside diameter allows the electrode bar to be passed through. The compression-forming tool 56 is depicted in FIG. 10. An electrode-shaped molding can thus be obtained.

Figure 11:
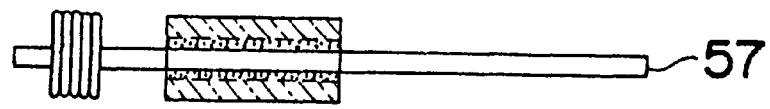
FIG. 11 is a diagram showing the structure of the electrode molding in accordance with Embodiment 2 of the present invention.

The electrode-shaped molding thus obtained may also be heated and baked at a high temperature in a vacuum or a hydrogen atmosphere. When necessary, a coil can be welded on the side where a discharge arc is formed following the above-described steps. FIG. 11 depicts an electrode-shaped molding 57 with an attached coil.

Figure 12:
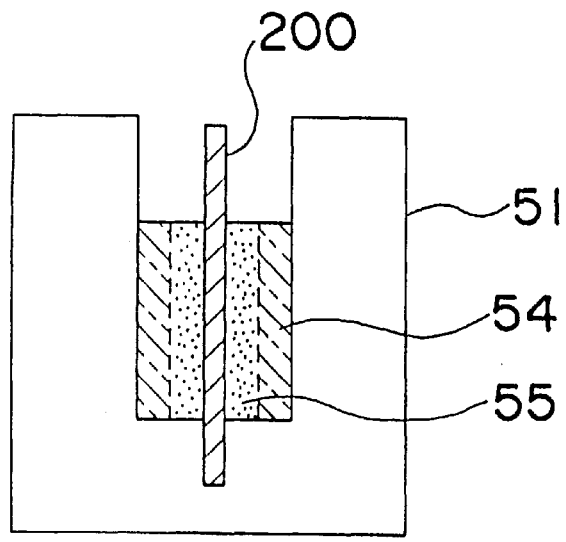
FIG. 12 is a diagram showing a step similar to the one in FIG. 9.
Figure 13:
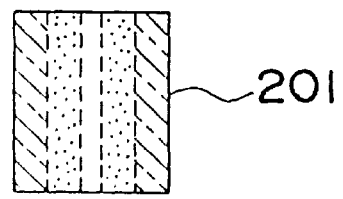
FIG. 13 is a diagram showing a structure similar to the one in FIG. 7.
Figure 14:
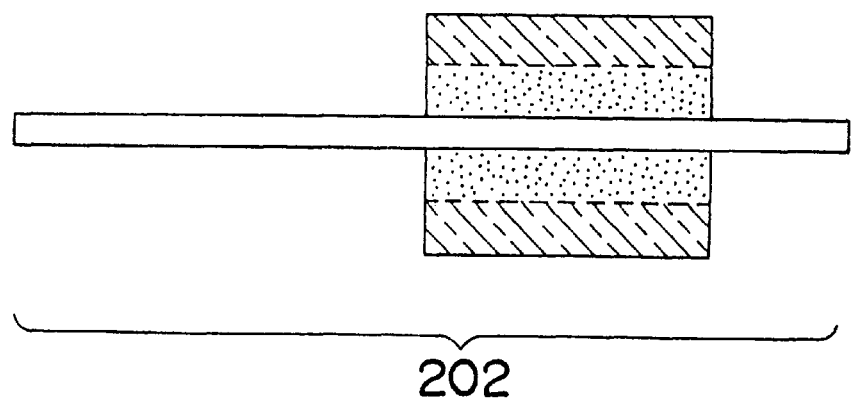
FIG. 14 is a diagram showing a structure similar to the one in FIG. 11.

As shown in FIG. 12, the glass sleeve 54 can also be filled with the glass powder 55 to form an air-tight sealing component by using, instead of the electrode bar 50, a cylindrical tungsten tool 200 having the same size as the diameter of the electrode bar. Next, as shown in FIG. 13, the glass sleeve filled with the glass powder is taken out of the mold 51 and sintered, yielding a sintered glass sleeve 201. The glass sleeve 201 thus sintered is slid to a prescribed position (region) of the electrode bar, and can thus be used as an electrode molding 202 (FIG. 14). Although a mold 51 and a cylindrical tool 200 made of tungsten were used in the present embodiment, it is apparent that no limitations are imposed in terms of material, and the present embodiment can also be implemented using components made of molybdenum, stainless steel, and the like.

A metal powder whose coefficient of thermal expansion is close to that of the electrode bar material may also be admixed to the glass powder. It is possible, for example, to fill the glass sleeve in the same manner as above with a mixed powder obtained by uniformly rubbing a metal material such as a tungsten powder, tungsten oxide powder, molybdenum powder, molybdenum oxide powder, or the like together with a Vycor powder in a mortar. The admixture of a metal powder shifts the coefficient of thermal expansion of the mixed powder closer to that of the electrode bar and results in a better air-tight seal.

When a nonuniform mixed powder is used, the high-melting mixed powder should be placed closer to the end at which the discharge arc is formed.

Figure 15:
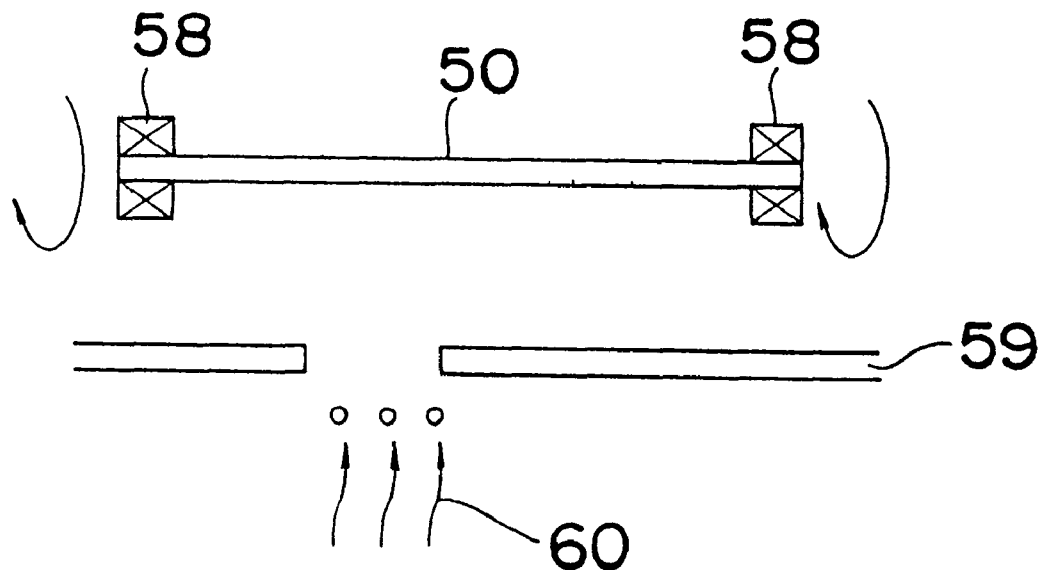
FIG. 15 is a diagram showing a manufacturing method in which metal vapor is deposited on the electrode bars in accordance with Embodiment 2 of the present invention.

Even when a mixed powder is not used, metal vapor can be deposited on he portion of the electrode bar sealed within the outer tube. FIG. 15 depicts the manner in which metal vapor is deposited on the electrode bar. Although this is not shown in FIG. 15, vapor deposition is performed in a vacuum or an inert gas atmosphere. The two ends of the electrode bar 50 are held in a rotatable chuck 58, a shutter plate 59 for preventing vapor from depositing in deposition-free areas is placed underneath the electrode bar, and metal vapor 60 is supplied from below for deposition on the sealing portion and the outer tube of the electrode bar. A glass sleeve is placed over the vapor-deposited electrode bar thus obtained, yielding an electrode-shaped molding, as shown in FIGS. 9 and 10.

It is also possible to perform metal sputtering, thermal CVD, plasma CVD, or the like. Even with the steps thus modified, the ultimately obtained sealed structure for lamps exhibits excellent high-pressure resistance and adhesion.

When the glass sleeve used consists of glass sleeves made of different materials, the higher-melting glass sleeve should be disposed near the end at which the discharge arc is formed. When a glass sleeve having a continuously varying melting point is used, the end of the glass sleeve with a gradually increasing melting point should be disposed near the end at which the discharge arc is formed. This is because, as a rule, a high-melting material is only slight-ly reactive with sealed materials such as metal halides, and can operate at higher temperatures, so using a high-melting material for the portion closest to the light-emitting tubular component is efficient from the standpoint of the life characteristics of a lamp.

The following is a description of a step for sealing the electrode-shaped holding 57 in the outer lamp tube.

Figure 16:
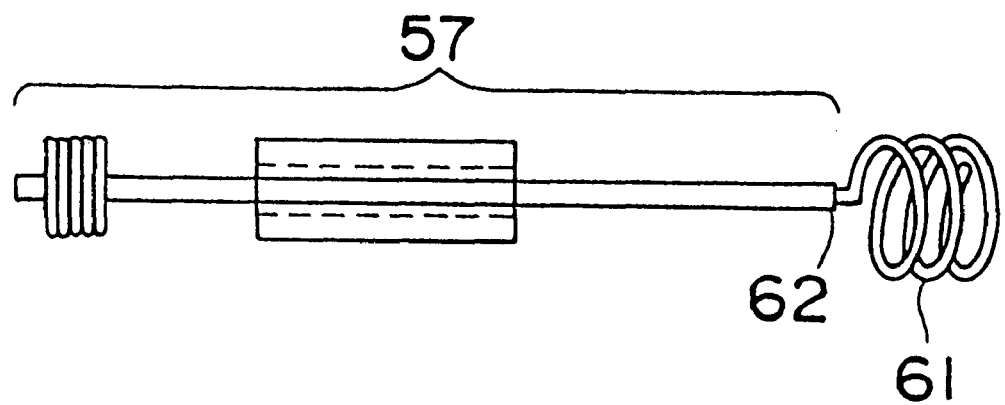
FIG. 16 is a diagram showing the structure of the electrode in accordance with Embodiment 2 of the present invention.

FIG. 16 depicts the electrode to be introduced into a lamp. To hold the electrode within the lateral tubular component, the metal spring 61 is welded to that end portion 62 of the electrode-shaped molding 57 where the molding is connected to an outside drive.

Figure 17:
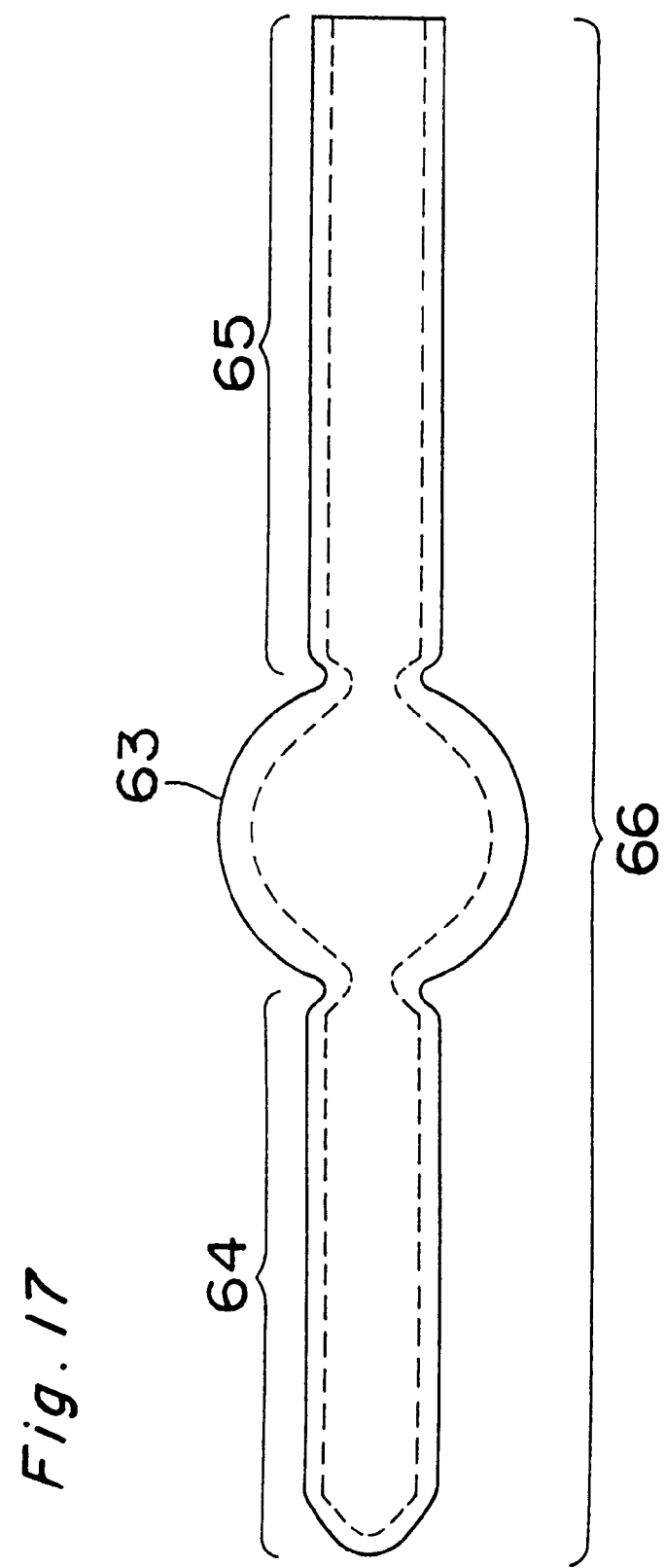
FIG. 17 is a diagram showing the structure of the outer tube in accordance with Embodiment 2 of the present invention.

FIG. 17 depicts an outer tube 66 prepared during a separate step. The tube comprises a hollow, roughly spherical light-emitting tubular component 63 obtained by heating and expanding quartz glass to a prescribed shape, and lateral tubular components 64 and 65 (quartz glass tubes) projecting from both ends of the light-emitting tubular component 63. The lateral tubular component 65 is obtained by inserting and sealing an electrode. One end of the lateral tubular component 64 is closed, whereas the component 65 is open at the other end to allow electrode insertion.

First, the discharge electrode in FIG. 16 is inserted through the lateral tubular component 65 of the outer tube after the light-emitting tubular component of the lamp in FIG. 17 has been formed and processed. The electrode is inserted with the aid of an insertion bar whose diameter is somewhat less than the inside diameter of the lateral tube. The insertion of the discharge electrode can be observed with the aid of a projector. The positions of the electrode and the light-emitting tube are depicted on the projector screen, and the electrode is inserted accordingly.

Figure 18:
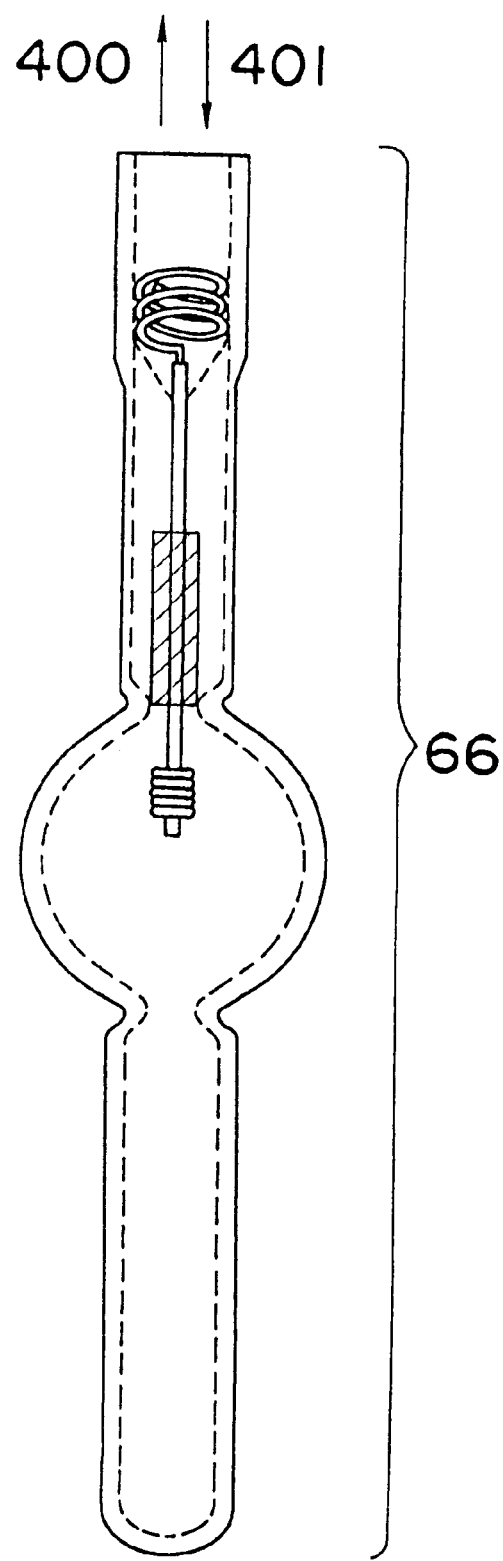
FIG. 18 is a diagram showing a step of the manufacturing method according to Embodiment 2 of the present invention.
Figure 19:
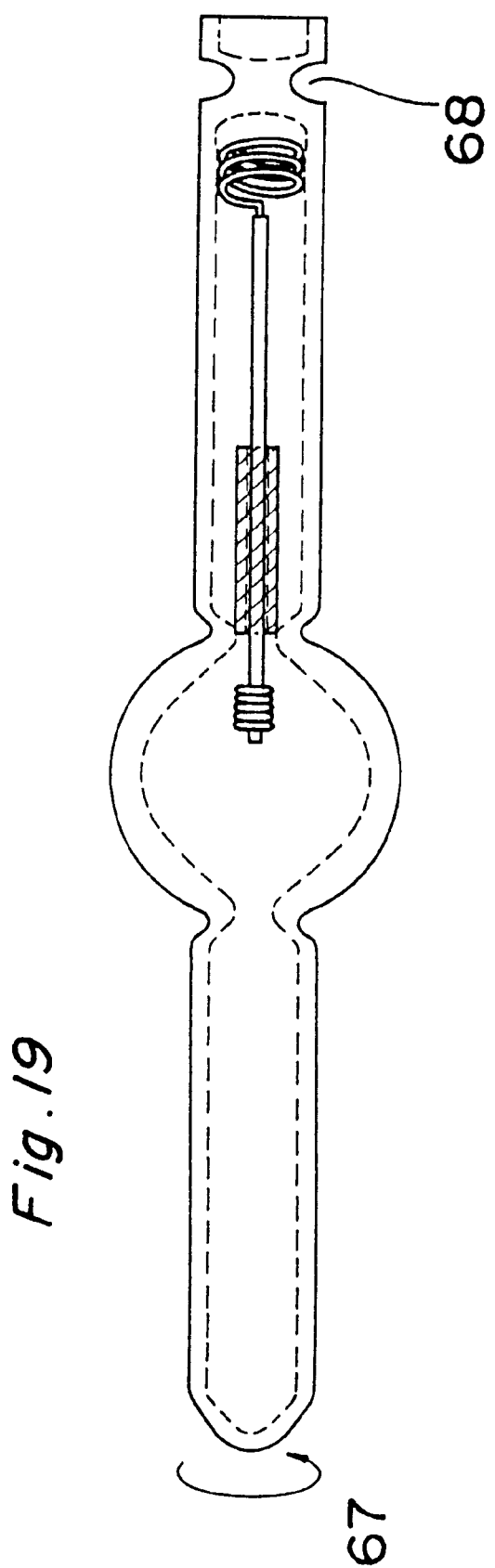
FIG. 19 is a diagram showing a step of the manufacturing method according to Embodiment 2 of the present invention.

The interior of the outer tube 66 is subsequently evacuated, as shown by the schematic arrow 400 in FIG. 18. Although this is not shown in the drawing, the evacuation is performed using a vacuum pump, and the interior of the outer tube 66 is exhausted to a pressure of about $10^{-5}$ torr. Argon gas is then sealed within the outer tube 66 at 200 mmbarr, as schematically shown by arrow 401 in FIG. 18. In this state, a laser or the like is used to heat and seal the yet-unsealed end portion 68 near the open end of the lateral tubular component 65, as shown in FIG. 19. Although this is not shown in FIG. 19, it is also possible to secure the outer tube 66 in a rotatable chuck and to perform heating and sealing while rotating the outer tube 66, as depicted by arrow 67.

Figure 20:
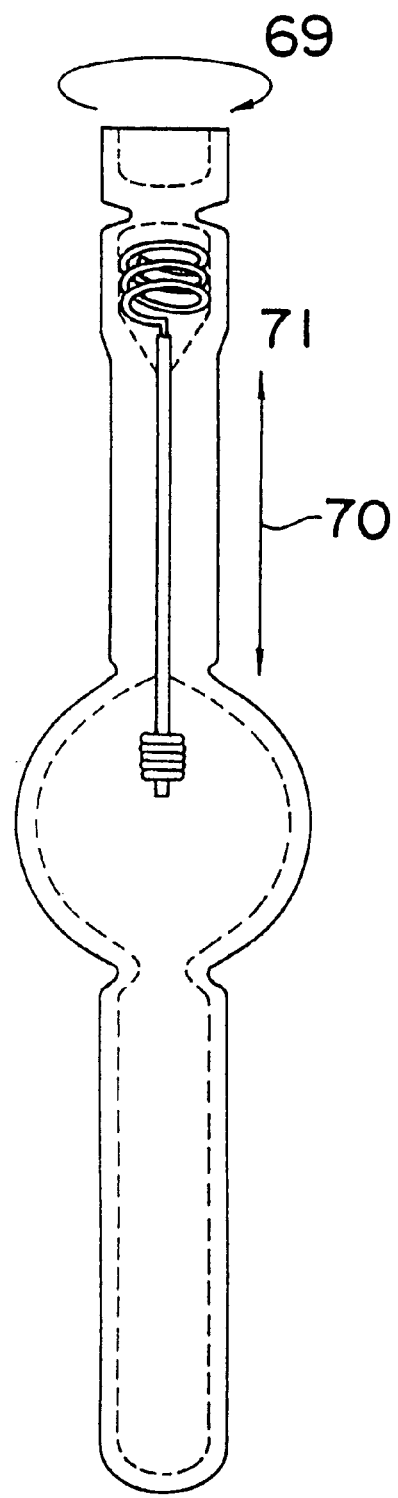
FIG. 20 is a diagram showing a step of the manufacturing method according to Embodiment 2 of the present invention.

Although this is not shown in the drawing, the outer tube 66 is subsequently secured in a rotatable chuck such that this time the lateral tubular component 65 containing an inserted electrode is on the upper side, as shown in FIG. 20. In this state, the outer tube 66 is rotated as shown by arrow 69, and the end portion of the lateral tubular component 65 is heated and melted during rotation. This process is performed using the laser schematically shown by arrow 70. The laser is moved up and down over an appropriate length of the lateral tubular component 65, as shown by arrow 71; and the lateral tubular component 65 is air-tightly sealed by being heated and melted.

Because they have lower melting points than does quartz glass, glass sleeves and glass powders having certain melting points sometimes boil and expand in the process before the quartz glass is melted. For example, the Pyrex glass manufactured by Corning has a softening point of 821° C. and is difficult to seal because of such boiling and expansion. The aforementioned Vycor glass has a softening point of 1530° C., can be easily sealed without undergoing boiling or expansion, and can be bonded with high adhesion, as described in Embodiment 1.

Figure 21:
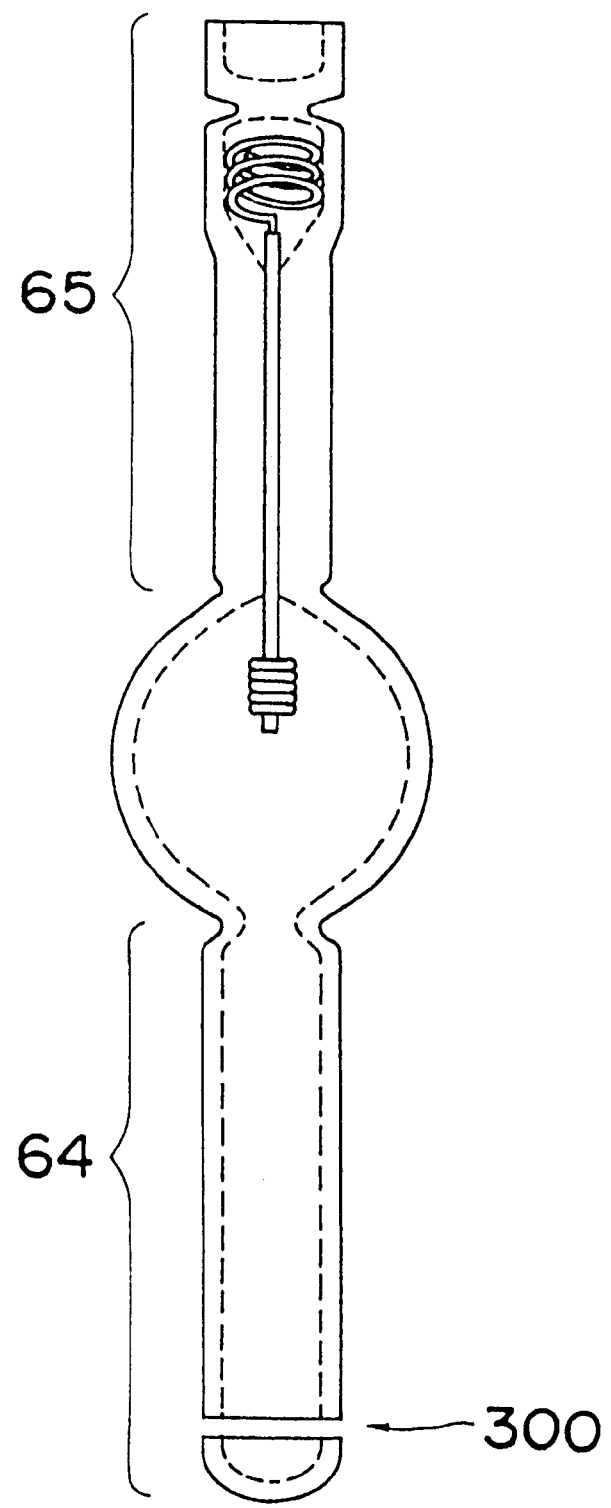
FIG. 21 is a diagram showing a step of the manufacturing method according to Embodiment 2 of the present invention.
Figure 22:
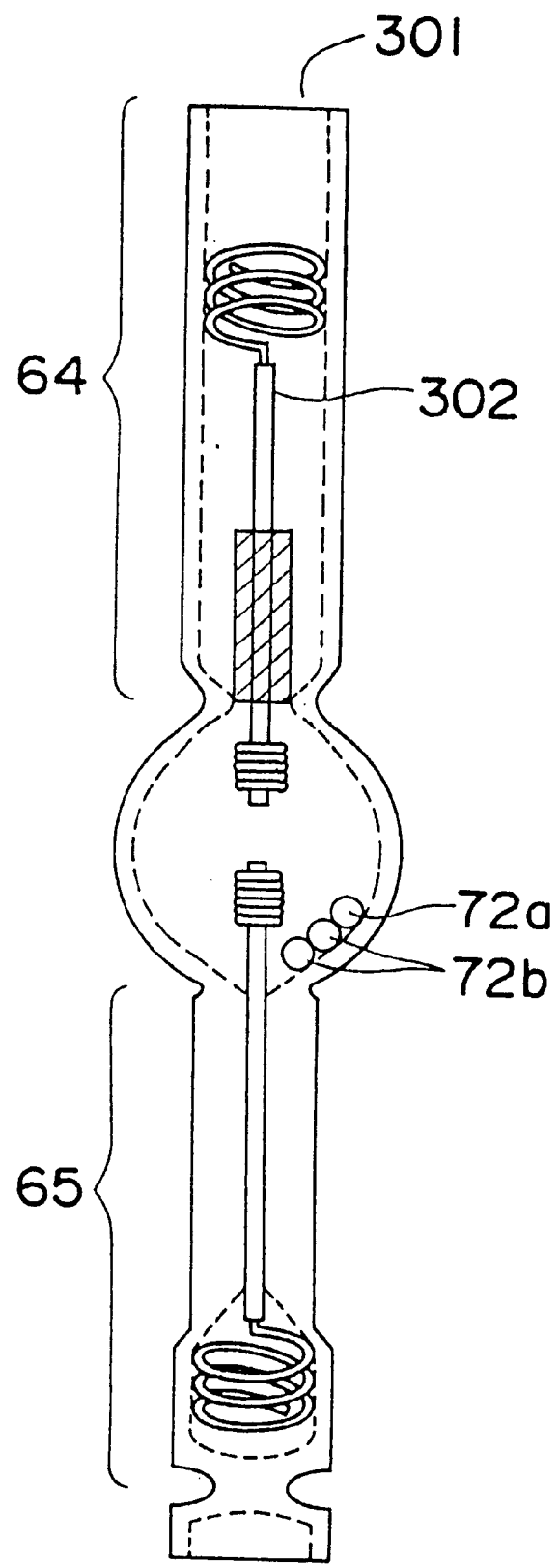
FIG. 22 is a diagram showing a step of the manufacturing method according to Embodiment 2 of the present invention.

A single electrode was sealed in the light-emitting tube during the step described above. The sealing of another electrode will now be described. The initially closed end portion of the lateral tubular component 64 is, for example, cut off with a cutter (as schematically shown by arrow 300), and an open end 301 is formed in order to insert the other electrode through the other end, as shown in FIG. 21. Next, the lamp is positioned such that the open end 301 thereof faces upward, as shown in FIG. 22, and mercury 72a, metal halides 72b, and other light-emitting substances for the lamp are introduced through the open end 301 and sealed. An electrode 302 is also introduced. The amount in which the mercury is sealed varies with the volume of the light-emitting tubular component and the interelectrode distance, and is 90 mg when the internal volume of the light-emitting tubular component 63 is 0.45 cc and the interelectrode distance is 1.5 mm. As a result, the lamp voltage during lighting is 80 V.

0.4 mg indium iodide and 1.0 mg of thulium iodide are sealed as the metal halides.

Figure 23:
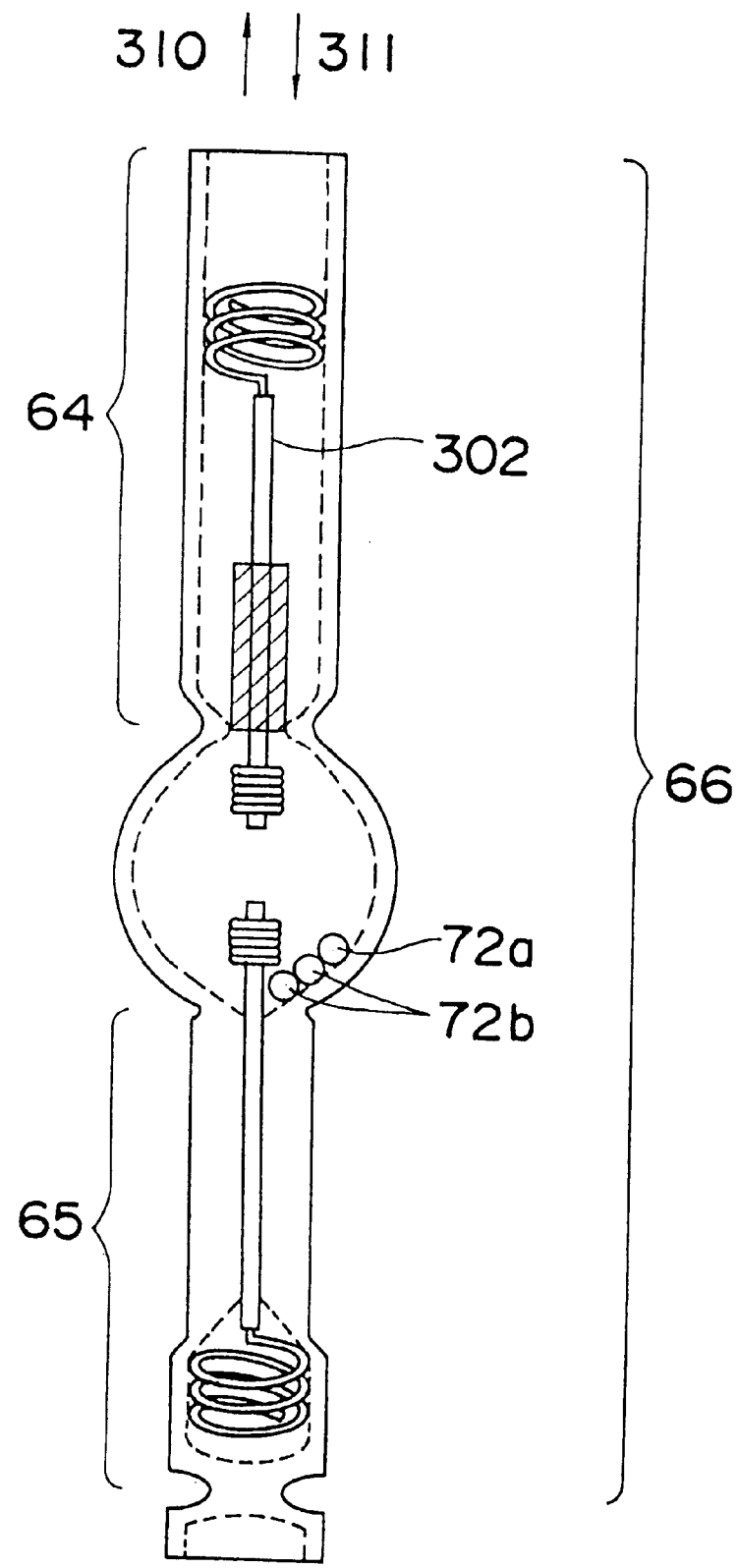
FIG. 23 is a diagram showing a step of the manufacturing method according to Embodiment 2 of the present invention.
Figure 24:
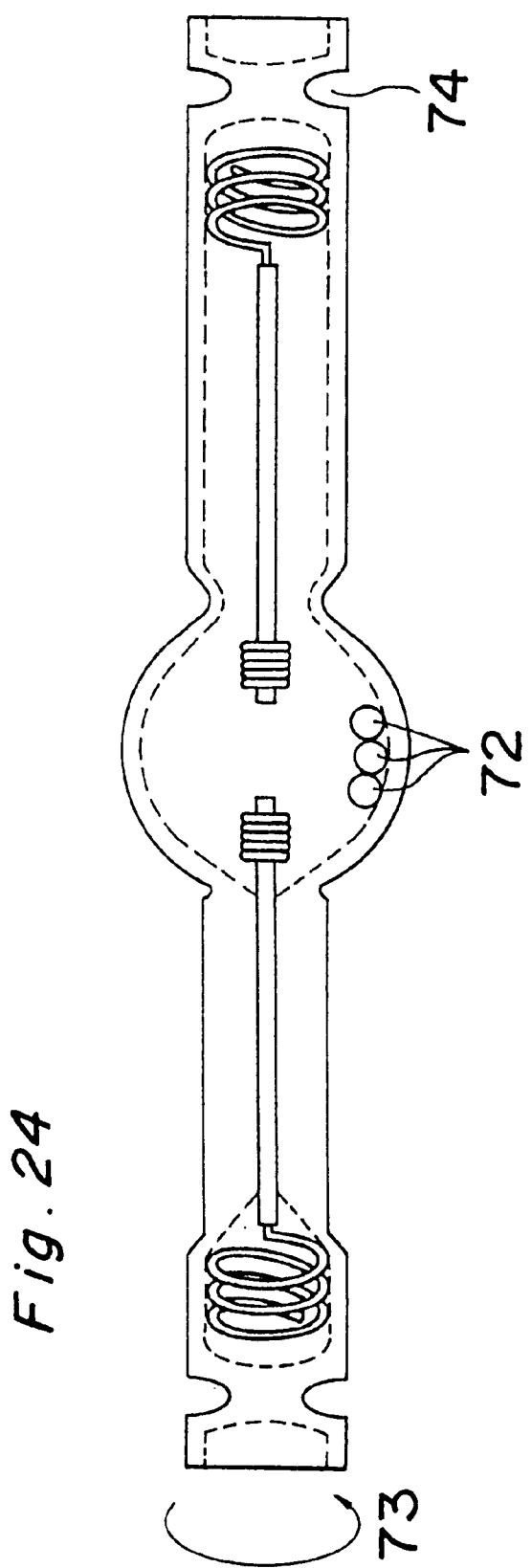
FIG. 24 is a diagram showing a step of the manufacturing method according to Embodiment 2 of the present invention.

The outer tube 66 is subsequently evacuated, as shown by the schematic arrow 310 in FIG. 23. Although this is not shown in the drawing, the evacuation is performed using a vacuum pump, and the pressure in the outer tube 66 is reduced to about $10^{-5}$ torr. A prescribed amount of dried argon gas is then sealed inside the outer tube 66, as schematically shown by arrow 311 in FIG. 23. In this state, the area near the yet-unsealed end of the lateral tubular component 54 is heated and sealed using a laser or the like, as schematically shown by arrow 74 in FIG. 24. Although this is not shown in FIG. 24, the outer tube 66 may also be held in a rotatable chuck, and then rotated, heated, and sealed, as shown by arrow 73.

Since mercury, metal halides, and other substances having high vapor pressure are sealed inside the light-emitting tubular component 63, this component is air-tight-ly sealed while being cooled to prevent the sealed substance 72 inside the light-emitting tubular component from being vaporized when the lateral tubular component 65 is heated with a laser.

Figure 25:
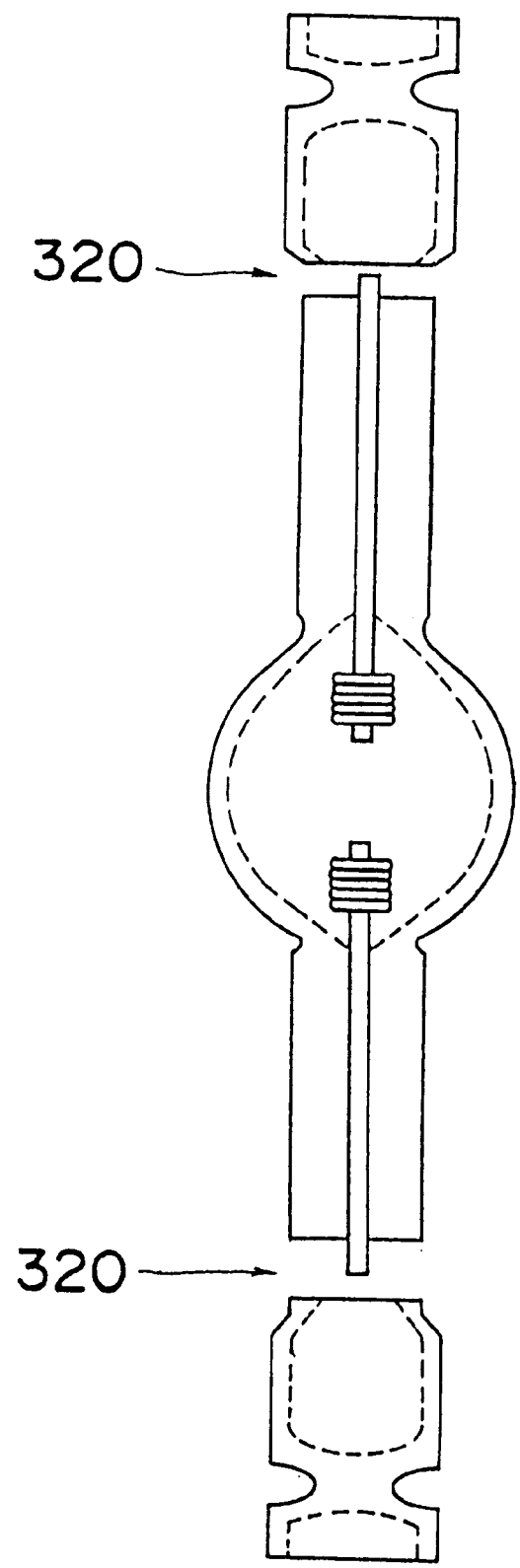
FIG. 25 is a diagram showing a step of the manufacturing method according to Embodiment 2 of the present invention.

In addition, as shown in FIG. 25, glass at the ends of both lateral tubes is cut off (for example, with a cutter), as schematically shown by arrow 320, in order to expose the electrodes on the sides where the electrode bars are connected to an external drive. The metal springs 61 at both electrode ends may also be removed at this time. It is thus possible to obtain a high-pressure discharge lamp with the same excellent air-tightness and resistance to high pressure as in Embodiment 1 in FIG. 1.

Figure 26:
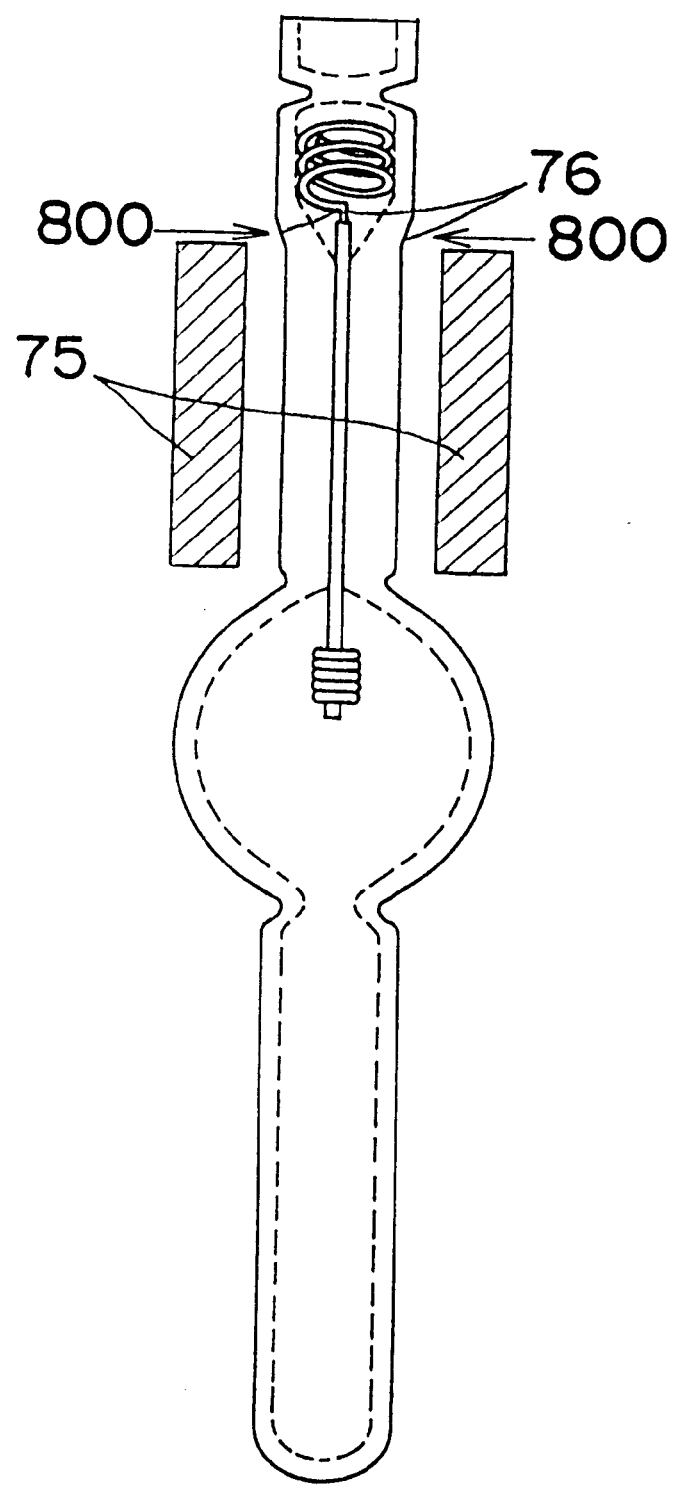
FIG. 26 is a diagram showing a step of the manufacturing method according to Embodiment 2 of the present invention.

Although the sealing method employed in the above description involved heating and melting the assembly while keeping the interior of the light-emitting tubular components 63 at a reduced pressure, thus baking and melting off the outer tube of the sealing components, it is also possible, as shown in FIG. 26, to adopt a sealing method in which the sealing components are heated and melted, the rotation of the outer tube 66 is then stopped, and the sealing components are quickly compressed and molded by a mold 75. With this method as well, no particular problems are encountered in obtaining a high-pressure discharge lamp with the same excellent air-tightness and resistance to high pressure as in Embodiment 1. An advantage of performing molding with the aid of a metal mold is that the designed lamp can be easily molded without any variations in the shape of the sealing components.

Embodiment 3

Figure 27:
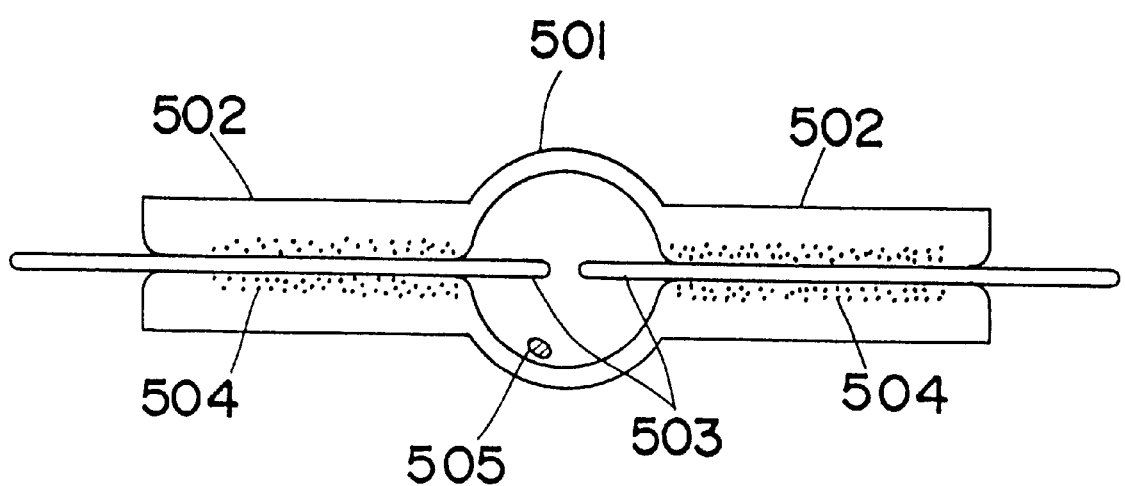
FIG. 27 is a structural diagram showing the high-pressure discharge lamp of Embodiment 3 of the present invention.

FIG. 27 is a structural diagram showing Embodiment 3 of the high-pressure discharge lamp of the present invention.

In FIG. 27, 501 is spherical light-emitting component made of quartz glass and designed for forming a discharge arc in the discharge space, and 502 are sealing components containing air-tight-ly sealed, electrically conductive metal structures for supplying electric current to the discharge arc. 503 are cylindrical tungsten electrodes serving as the electrically conductive metal structures for supplying electric current to the discharge arc.

One end of each tungsten electrode 503 is disposed inside the light-emitting component 501 for sustaining a discharge arc, whereas the other end is brought outside via the sealing components 502 for connection to an external drive for supplying electric current to the discharge arc (not shown in FIG. 27). As shown by the small black dots in the drawing, a metal material, such as a tungsten powder 504 is distributed near the interface between the quartz glass and the tungsten electrodes 503 in the sealing components 502. Mercury 505 is sealed as a light-emitting substance within the light-emitting component 501, as is argon gas, which, although not shown in the drawing, is designed to aid in the starting of the lamp.

The principal dimensional data for the lamp shown in FIG. 27 are as follows: the internal volume of the spherical light-emitting component 501 is about 0.45 cc, the diameter of the tungsten electrodes 503 is 0.9 mm, and the gap between the tungsten electrodes 503 in the spherical light-emitting component 501, that is, the interelectrode distance, is 1.5 mm.

A lamp voltage of about 80 V can be obtained when mercury 505 is sealed in an amount of 90 mg, and the lamp is lighted at a power of 200 W. The corresponding estimated operating pressure is about 200 atm. Surprisingly, the high-pressure discharge lamp of the present invention, which does not have a conventional sealed foil structure or a conventional sealed rod structure but which is provided with a sealed structure in which the tungsten powder 504, acting as an air-tight sealing component, is distributed near the interface between a region of the tungsten electrode 503 and quartz glass, operates normally and can withstand operating pressures as high as about 200 atm, with the mercury 505 completely vaporizing without condensing near the tungsten electrodes 503 of the sealing components 502.

The advantages of the sealed structure of the high-pressure discharge lamp described in Embodiment 3 of the present invention will become more apparent from the results of the certification tests described below.

Figure 28A:
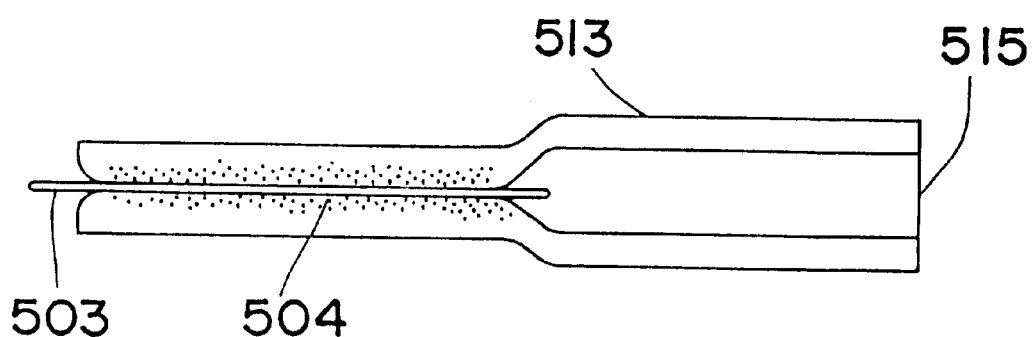
FIG. 28(a) is a structural diagram showing the sealed structure of Embodiment 3 of the present invention.
Figure 28B:
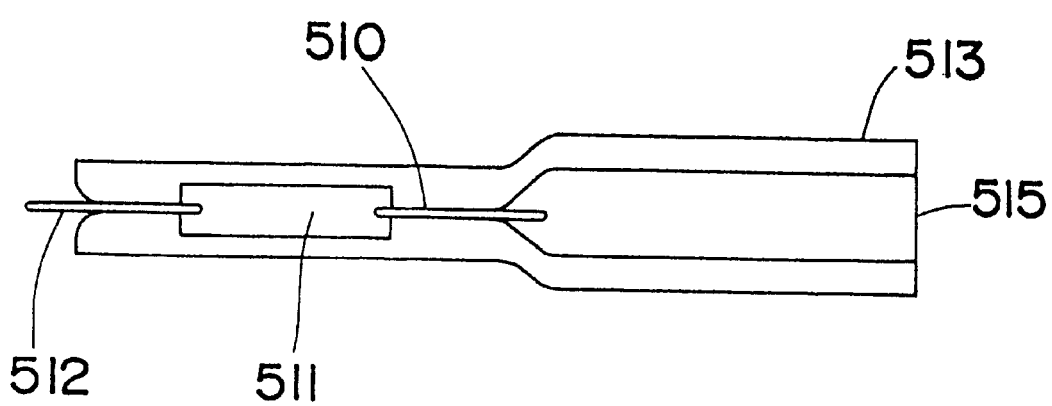
FIG. 28(b) is a structural diagram showing a conventional sealed structure.

FIGS. 28(a) and 28(b) are diagrams showing the sealed structure used in the certification tests. FIG. 28(a) depicts a glass tube obtained by distributing the tungsten powder 504 near the interface between quartz glass and the tungsten electrodes 503 with a diameter of 0.9 mm, and sealing the electrodes in a quartz glass tube 513 with an outside diameter of 6 mm and an inside diameter of 2 mm in the same manner as in Embodiment 3 of the present invention in FIG. 27.

Furthermore, FIG. 28(b) depicts a glass tube obtained by providing the quartz glass tube 513 with a foil seal. 510 is a tungsten electrode having the same diameter (0.9 mm) as the tungsten electrodes 503, but a different length; and 511 and 512 are a molybdenum foil and a molybdenum bar, respectively. The thickness of the molybdenum foil 511 is 0.02 mm.

Nitrogen gas was pressurized while being introduced at a constant rate through the open end 515 of the quartz glass tube 513 into the glass tubes shown in FIGS. 28(a) and 28(b), and the pressure at which the glass tube fractured was measured to gauge its resistance to high pressure. The results indicate that whereas the glass tube with the sealed foil structure shown in FIG. 28(b) fractured at about 160 atm, no fracture occurred in the sealed structure of Embodiment 3 of the present invention depicted in FIG. 28(a), even when a pressure of 210 atm was applied.

In a separate measurement, the quartz glass tube 513 was evacuated through the open end 515 of the quartz glass tube 513, and it was found that the glass tubes depicted in FIGS. 28(a) and 28(b) could each be evacuated to a degree of vacuum of about $10^{-6}$ torr.

Thus, the sealed structure of Embodiment 3 of the present invention depicted in FIG. 27 or 28(a) possesses better air-tightness or resistance to high pressure than does a conventional sealed foil structure as a result of the fact that the tungsten powder 504 distributed near the interface between the tungsten electrode 503 and the quartz glass acts as a binder for bonding quartz glass and tungsten (tungsten electrode 503), which is normally very difficult to bond. (Although the exact reason for this is not yet understood, it is probably that the tungsten powder 504 is distributed throughout the quartz glass, shifting its coefficient of thermal expansion closer to that of tungsten and making peeling more difficult, and that some of the tungsten powder 504 forms strong chemical bonds with the tungsten electrode 503.)

Although the present embodiment was described with reference to a high-pressure discharge lamp in which a tungsten powder 504 was distributed near the interface between the tungsten electrode 503 and quartz glass, it is also possible to use a tungsten oxide powder instead of the tungsten powder 504. A powder of a metal other than tungsten, such as molybdenum, may also be used, as may a molybdenum oxide powder. Lamps obtained using such replacement powders retain their excellent air-tightness or resistance to high pressure. Mixtures of the aforementioned powders may also be used.

Embodiment 4

Embodiment 4 of the present invention will now be described with reference to FIG. 29.

Figure 29:
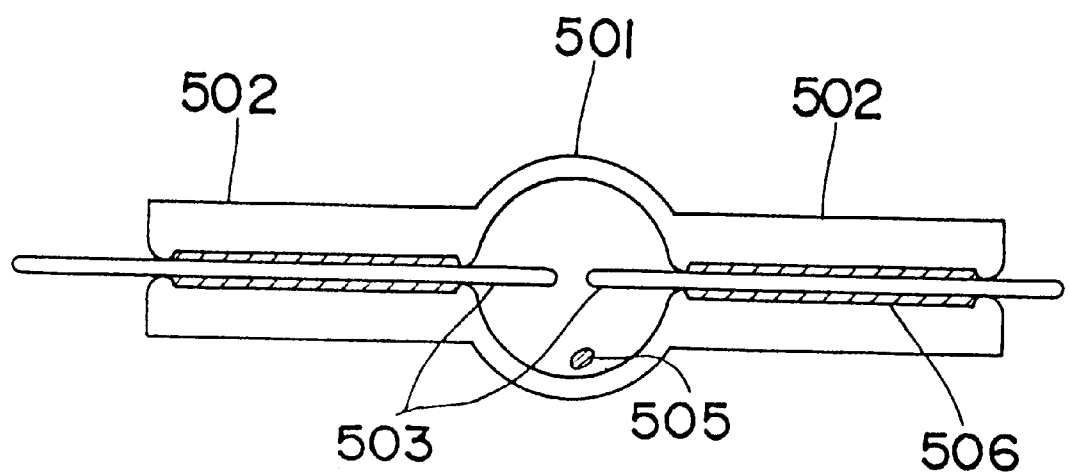
FIG. 29 is a structural diagram showing the high-pressure discharge lamp of Embodiment 4 of the present invention.

The high-pressure discharge lamp of Embodiment 4 of the present invention depicted in FIG. 29 has a sealed structure in which the tungsten powder 504 in the lamp of Embodiment 3 depicted in FIG. 27 is replaced with thin tungsten films 506, acting as air-tight sealing components, and the tungsten electrodes 503 are air-tight-ly sealed with quartz glass (sealing components 502) via the thin films 506.

In the lamp of the present embodiment as well, a lamp voltage of about 80 V can be obtained when mercury 505 is sealed in an amount of 90 mg, and the lamp is lighted at a power of 200 W. The mercury 505 completely vaporizes without condensing near the tungsten electrodes 503 of the sealing components 502, yielding a sealed structure resistant to high pressures that operates normally and can withstand operating pressures as high as about 200 atm.

The high-pressure discharge lamp of the present embodiment preserves its excellent air-tightness and resistance to high pressure when provided with a structure in which the thin tungsten films 506 are replaced with thin films of tungsten oxide. It is also possible to use a structure with substitute thin metal films, such as thin molybdenum films or thin molybdenum oxide films. Structures obtained by forming multilayer thin films from such films are also acceptable.

It should be noted with regard to Embodiments 3 and 4 that it is particularly advantageous for an oxidizing treatment to be performed on at least those portions of the tungsten electrodes 503 that are embedded in the sealing components 502. Such surface oxidation makes it possible to almost completely prevent cracks from forming in, the quartz glass near the surfaces of the tungsten electrodes 503, and is effective for achieving air-tightness or resistance to high pressure.

Figure 39A:
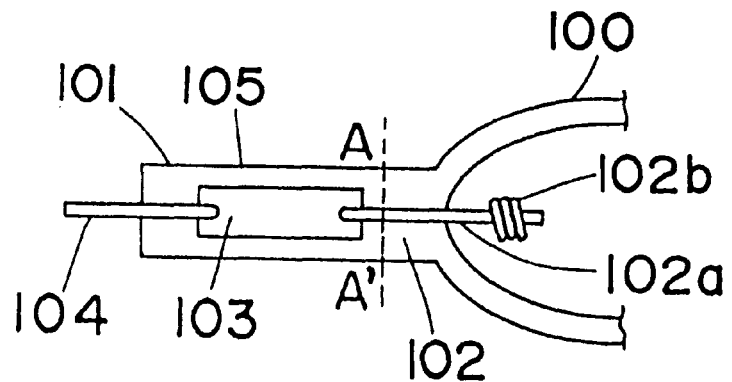
FIG. 39(a) is a diagram showing the sealed foil structure of a conventional high-pressure discharge lamp.
Figure 39B:
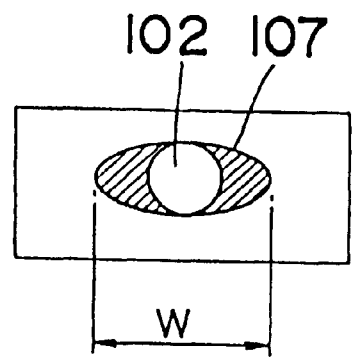
FIG. 39(b) is a diagram showing the cross section area AA' of FIG. 39(a).
Figure 40:
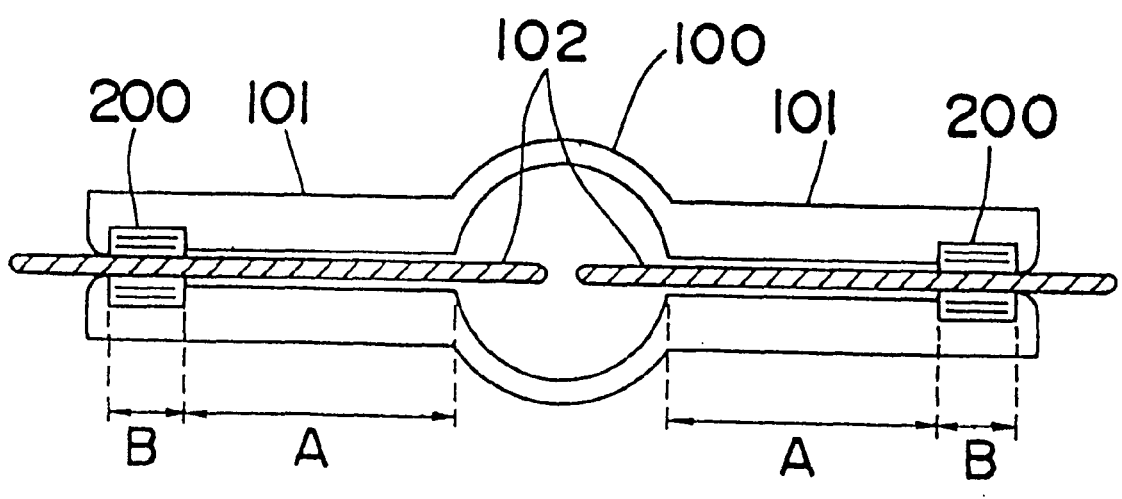
FIG. 40 is a diagram showing the sealed rod structure of a conventional high-pressure discharge lamp.

Furthermore, Embodiments 3 and 4 were described with reference to cases in which the electrically conductive metal structures for supplying electric current to the discharge arc were made of the tungsten electrodes 503 alone, but lamps in which the electrically conductive metal structures are made of the tungsten electrodes (102 in FIG. 39; 510 in FIG. 28(b)), molybdenum foil (103 in FIG. 39; 511 in FIG. 28(b)), and lead wires for introducing outside current (104 in FIG. 39; 512 in FIG. 28(b)) seen in the conventional sealed foil structures in FIGS. 39 and 28(b) have the same excellent air-tightness or resistance to high pressure as those exhibited by the lamps of Embodiments 3 and 4 as long as these structures are obtained by distributing a tungsten powder at least near the interface between the tungsten electrodes (102 in FIG. 39; 510 in FIG. 28(b)) and the quartz glass, or bonding the tungsten electrodes with the quartz glass via thin tungsten films.

In addition, Embodiments 3 and 4 were described with reference to cases in which mercury alone was sealed as a light-emitting substance in high-pressure discharge lamps, but it is also possible to use lamps in which a light-emitting substance other than mercury (for example, a metal halide) is also added.

Although the sealed structures for the lamps typified by Embodiments 3 and 4 are particularly advantageous for high-pressure discharge lamps containing sealed mercury, metal halides, and other substances that are liquid or solid at room temperature but vaporize and emit light during lighting, it is apparent that such structures are also effective for lamps containing rare gases alone, such as, for example, xenon-discharge lamps.

In addition, Embodiments 3 and 4 were described with reference to so-called double-end lamps in which the sealing components 502 extend from the light-emitting component 501 in opposite directions, but so-called single-end lamps (which have a single sealing component and in which a pair of electrodes are sealed in this sealing component) are also acceptable, in which case the sealed structure of the present invention is also applicable to incandescent lamps having heating coils, which are not discharge lamps.

Embodiment 5 below and subsequent embodiments pertain to a method for manufacturing the high-pressure discharge lamp of the present invention typified by Embodiments 3 and 4.

Embodiment 5

FIGS. 30 through 35 are process diagrams of the method for manufacturing high-pressure discharge lamps that pertains to Embodiment 5 of the present invention.

Figure 30:
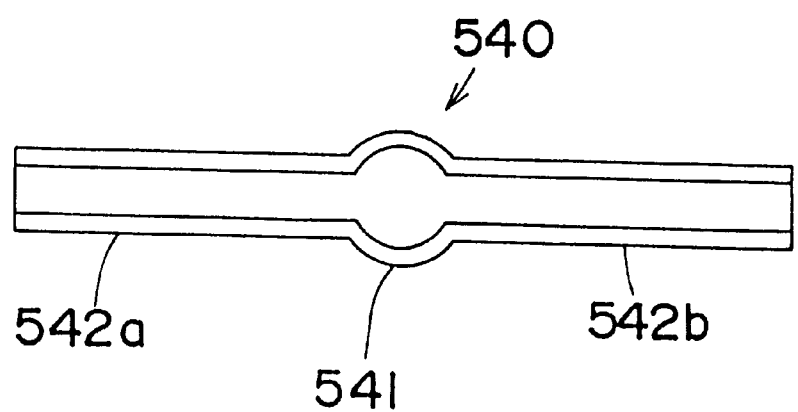
FIG. 30 is a diagram showing a step of the method for manufacturing a high-pressure discharge lamp in accordance with Embodiment 5 of the present invention.

In FIG. 30, 540, which is an outer tube prepared during a separate step, comprises a hollow spherical light-emitting tubular component 541 obtained by heating and expanding a quartz glass tube to a prescribed shape, and lateral tubular components 542a and 542b (quartz glass tubes) projecting from both ends of the light-emitting tubular component 541. The lateral tubular components 542a and 542b have uniform cross sections and remain circular along their entire lengths. It is apparent that their cross sections are smaller than that of the light-emitting component 541.

Figure 31:
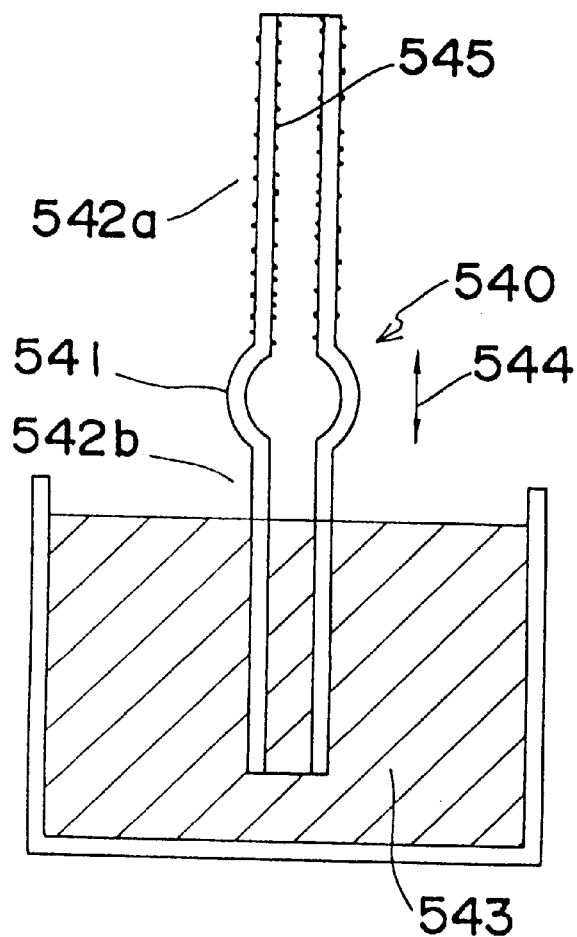
FIG. 31 is a diagram showing a step of the method for manufacturing a high-pressure discharge lamp in accordance with Embodiment 5 of the present invention.

In the outer tube 540 thus prepared, a tungsten powder is applied to the inner surfaces of the lateral tubular components 542a and 542b. A detailed description is given based on FIG. 31. In FIG. 31, 543 is a solution obtained by admixing a tungsten powder with a mean particle diameter of 2 $\mu$m and an $SiO_2$ powder with a mean particle diameter of 20 $\mu$m into an organic binder prepared by dissolving nitrocellulose in butyl acetate.

Solution 543 is applied to the lateral tubular component 542a. As shown in FIG. 31, this operation involves positioning the outer tube 540 such that the lateral tubular components 542a and 542b are disposed above and below the outer tube, and moving the tube up and down as shown by arrow 544. After the solution has been applied to the lateral tubular component 542a and allowed to dry naturally for about 10 minutes, the outer tube 540 is turned over, and the solution 543 is applied in the same manner to the other lateral tubular component (lateral tubular component 542b). The outer tube 540 obtained by applying the solution 543 to the lateral tubular components 542a and 542b is subsequently heat-treated for 30 minutes at a temperature of about 500° C. and the organic binder is pyrolyzed, causing the tungsten powder 545 to adhere to the inner surfaces of the lateral tubular components 542a and 542b and completing the coating step.

Figure 32:
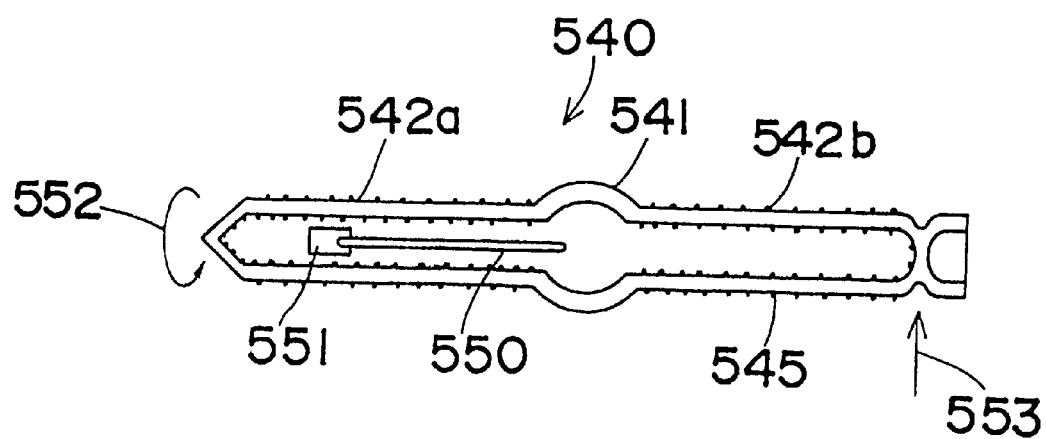
FIG. 32 is a diagram showing a step of the method for manufacturing a high-pressure discharge lamp in accordance with Embodiment 5 of the present invention.

The end of the lateral tubular component 542a is subsequently sealed, and, as shown in FIG. 32, a tungsten electrode 550, which is prepared in a separate step and which is an electrically conductive metal structure for supplying electric current to the discharge arc, is inserted into the lateral tubular component 542a through the lateral tubular component 542b. Here, an iron piece 551 is connected to the end of the tungsten electrode 550 opposite from that disposed inside the light-emitting component 541 and designed to sustain an arc discharge. Although this is not shown in the drawing, the lateral tubular components 542a and 542b are held in a rotatable chuck in this state, and the glass tube 540 is rotated as shown by arrow 552. The area near the still-unsealed end of the lateral tubular component 542b is heated and sealed while the outer tube 540 is evacuated. This operation is performed, for example, with the aid of a laser, as schematically shown by arrow 553.

Figure 33:
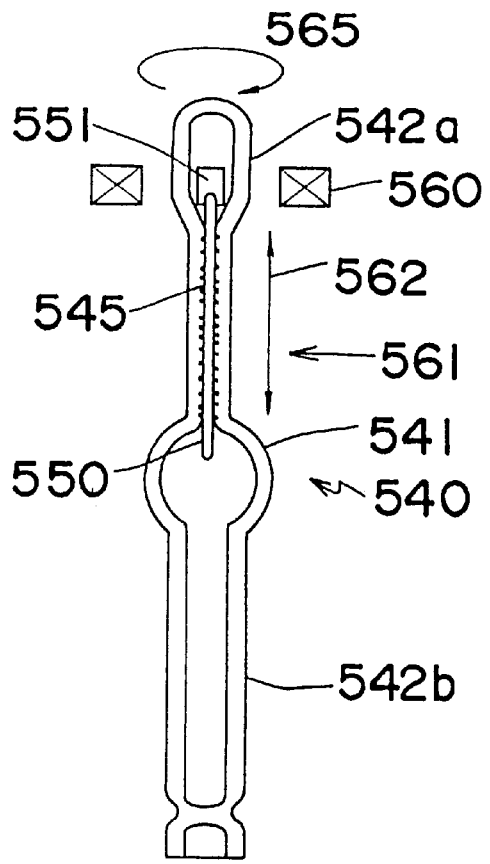
FIG. 33 is a diagram showing a step of the method for manufacturing a high-pressure discharge lamp in accordance with Embodiment 5 of the present invention.

Although this is not shown in the drawings, the outer tube 540 is subsequently held in a rotatable chuck such that this time the lateral tubular component 542a containing the inserted tungsten electrode 550 faces upward, as shown in FIG. 33. A movable magnet 560 is positioned this time outside the lateral tubular component 542a to cause magnetic force to act on the iron piece 551 and to prevent the tungsten electrode 550 from dropping, and the tungsten electrode 550 is placed in an appropriate manner inside the lateral tubular component 542a such that the end of the tungsten electrode 550 for sustaining the arc is disposed at a prescribed position within the light-emitting component 541.

In this state, the outer tube 540 is rotated substantially about the major axis of the outer tube 540, as shown by arrow 565, and the lateral tubular component 542a (quartz glass) is heated and collapsed during rotation. This process is performed with the aid of the laser schematically shown by arrow 561. The laser moves vertically over an appropriate length of the lateral tubular component 542a, softens and collapses the lateral tubular component 542a (quartz glass), as shown by arrow 562, and air-tight-ly seals the lateral tubular component 542a.

Figure 34:
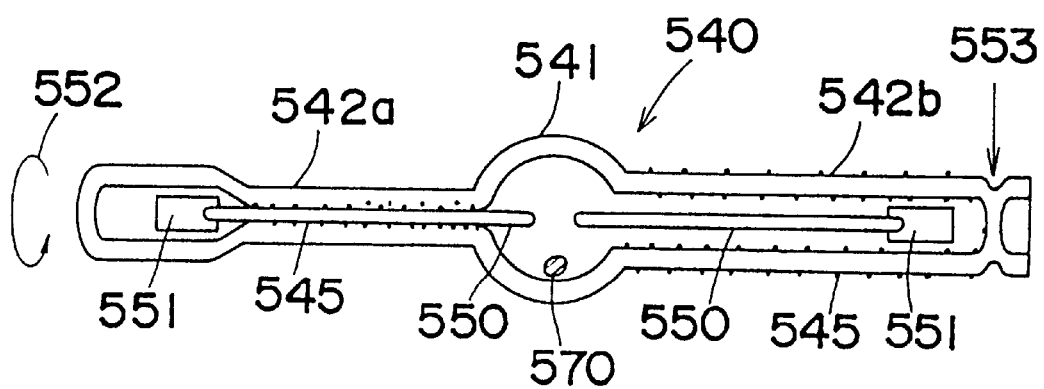
FIG. 34 is a diagram showing a step of the method for manufacturing a high-pressure discharge lamp in accordance with Embodiment 5 of the present invention.

The outer tube 540 is subsequently released from the chuck hold (as shown in FIG. 34), the sealed end of the lateral tubular component 542b is cut off, and a tungsten electrode 550 (an iron piece 551 is connected to one end of the electrode) is reinserted into the lateral tubular component 542b. Mercury 570, which is the light-emitting substance, is simultaneously introduced into the light-emitting component 541. Although this is not shown in the drawing, this operation is performed by introducing a tubular needle through the open end of the lateral tubular component 542b and stopping the needle once its end is near the center of the light-emitting component 541. The needle is connected to a dried argon gas source of relatively low pressure, and a stream of this gas passes through the needle, pushing out the mercury 570. The amount in which mercury 570 is sealed varies greatly with the volume of the light-emitting component 541 or the interelectrode distance. Specifically, this amount is 90 mg when the internal volume of the light-emitting component 541 is 0.45 cc, and the interelectrode distance 1.5 mm.

Although this is not shown in the drawings, the lateral tubular components 542a and 542b are held in this state in a rotatable chuck, and the glass tube 540 is rotated as shown by arrow 552. The outer tube 540 is subsequently evacuated, a prescribed amount of dried argon gas is introduced this time into the outer tube 540, and the area near the end of the lateral tubular component 542b is heated and sealed. Heating is performed with the aid of a laser, as schematically shown by arrow 553.

The lateral tubular component 542b is finally heated and collapsed with the aid of a laser, and is thus air-tight-ly sealed in the same manner as in the case of the lateral tubular component 542a depicted in FIG. 34. (When necessary, a means for cooling the light-emitting component 541 is added in order to prevent the evaporation of mercury 570.) The ends of the lateral tubular components 542a and 542b are cut off, the end of the tungsten electrode 550 to which the iron piece 551 is connected is exposed, and the iron piece 551 is removed, yielding the high-pressure discharge lamp in FIG. 35 that has the same excellent air-tightness and resistance to high pressure as in Embodiment 3. In this lamp, a tungsten powder 545 acting as an air-tight sealing component, is distributed near the interface between the tungsten electrode 550 and the quartz glass.

It is also possible to adopt a manufacturing method in which a step for oxidizing the surface of the tungsten electrode 550 (for example, an anodizing step) is added between the. step for distributing the tungsten powder 545 on the lateral tubular components 542*a* and 542*b* depicted in FIG. 31 and the step for sealing the tungsten electrode 550 in the lateral tubular component 542*a* depicted in FIG. 32.

Embodiment 6

Embodiment 6 of the method for manufacturing a high-pressure discharge lamp in accordance with the present invention will now be described. The method for manufacturing a high-pressure discharge lamp in accordance with the present embodiment is such that in the manufacturing method as described in Embodiment 5 above, the step described with reference to FIG. 31 and designed for applying the tungsten powder 545 to the lateral tubular components 542*a* and 542*b* is replaced with a step for forming thin tungsten films on the inner surfaces of the lateral tubular components 542*a* and 542*b*, as described below, with all the other steps being the same as in the manufacturing method of Embodiment 5.

Figure 36:
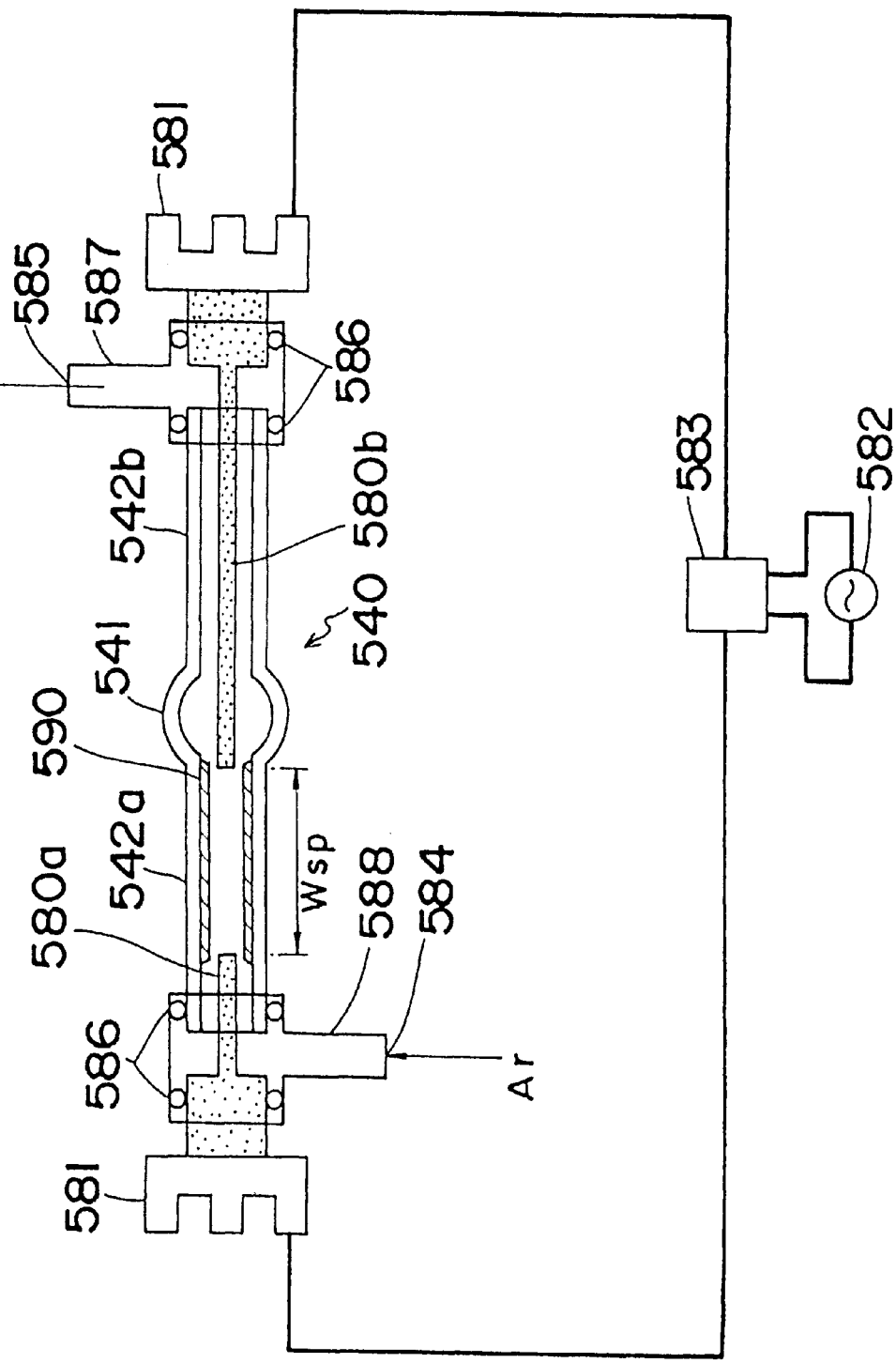
FIG. 36 is a schematic of a sputtering apparatus used in the method for manufacturing a high-pressure discharge lamp in accordance with Embodiment 6 of the present invention.

FIG. 36 is a drawing schematically showing the sputtering apparatus used in the step for forming thin tungsten films on the inner surfaces of the lateral tubular components 542*a* and 542*b* in accordance with the present embodiment. In the drawing, 580*a* and 580*b* are a pair of tungsten sputtering electrodes introduced through the open ends of the lateral tubular components 542*a* and 542*b*, respectively, and disposed such that an interelectrode region Wsp is formed within the lateral tubular component 542*a*.

The thin films grow substantially across this interelectrode region Wsp, and the interelectrode region Wsp must therefore be formed in the lateral tubular component 542*a* (or 542*b*). Aluminum heat-radiating plates 581 for suppressing the temperature increase during sputtering are connected to one end of each of the sputtering electrodes 580*a* and 580*b*, respectively, and a high-frequency power supply 582 is connected via a matching device 583. With this apparatus, the thin tungsten films are formed on the inner surfaces of the lateral tubular components 542*a* and 542*b*, as described below.

A vacuum seal is first formed within the outer tube 541 with the aid of the schematically shown O-ring seals 586 and flanges 587 and 588, which are disposed adjacent to the open ends of the lateral tubular components 542*a* and 542*b*. In this state, the outer tube 541 is evacuated to a given background level through an exhaust port 585 provided to a flange 587, using a vacuum apparatus in which a turbomolecular pump (not shown) is used as the main exhaust pump. Argon gas is then introduced through a gas feed port provided to a flange 588.

The argon gas is fed at a constant rate of about 3 sccm. High-frequency (500 kHz), power of 20 W is applied between the sputtering electrodes 580*a* and 580*b*, a glow discharge is created, and the tungsten is sputtered.

A thin tungsten film is thereby grown on the inner surface of the lateral tubular component 542*a* in the interelectrode region Wsp. After a thin tungsten film 590 with a thickness of about 100 nm has been formed by maintaining the discharge for a prescribed time, the sputtering electrodes 580*a* and 580*b* are rearranged within the lateral tubular component 542*b*, and a thin tungsten film is formed in the same manner on the inner surface of the lateral tubular component 542*b*.

Figure 35:
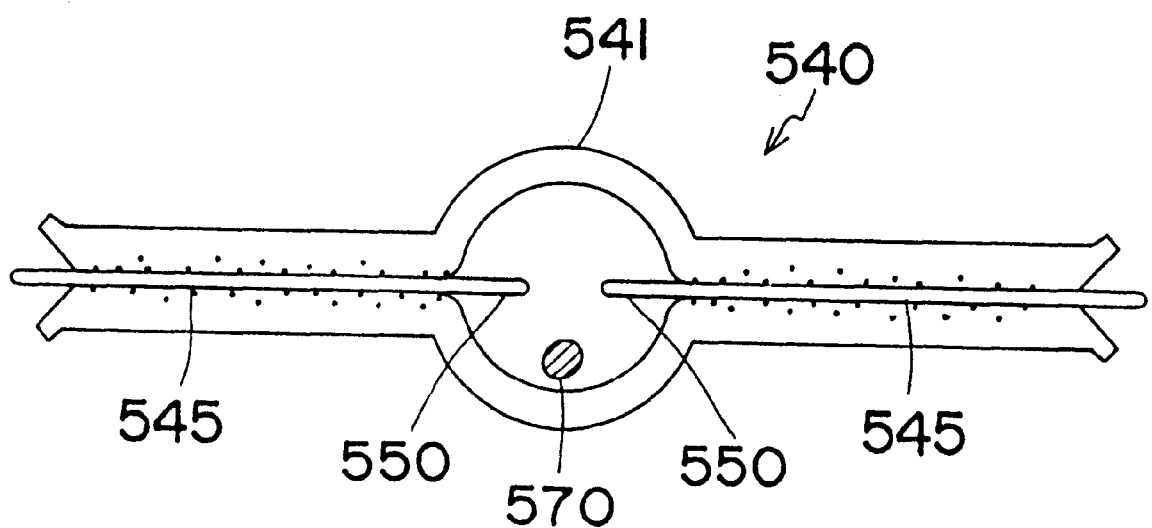
FIG. 35 is a diagram showing a step of the method for manufacturing a high-pressure discharge lamp in accordance with Embodiment 5 of the present invention.
Figure 37:
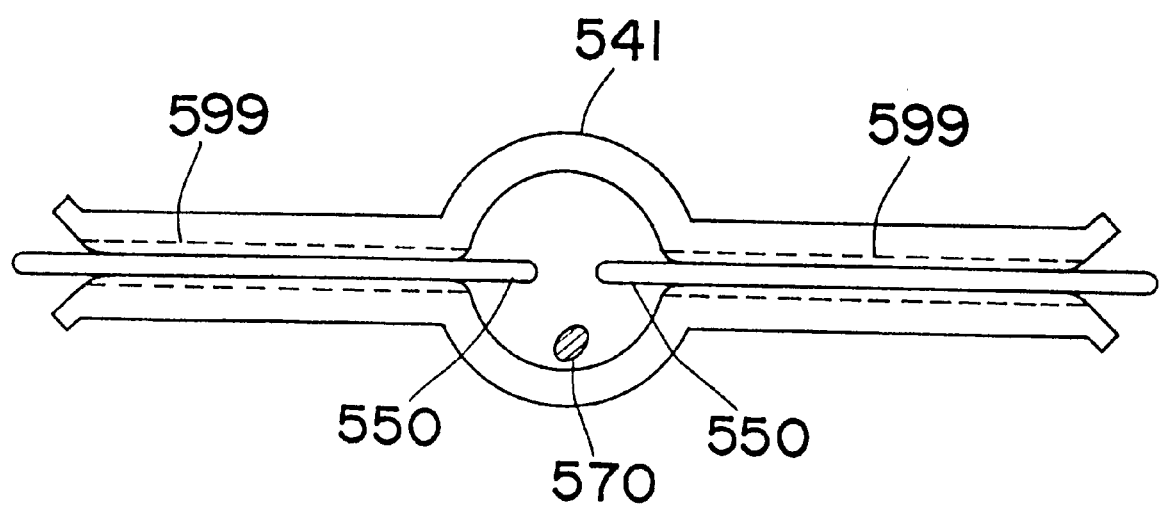
FIG. 37 is a diagram showing the high-pressure discharge lamp of Embodiment 6 of the present invention.

After the thin tungsten films 590 have been formed on the inner surfaces of the lateral tubular components 542*a* and 542*b*, the same step as that performed in Embodiment 5 and described with reference to FIGS. 32 through 34 is employed, making it possible to obtain, as is ultimately shown in FIG. 37 (which depicts a lamp with substantially the same structure as in FIG. 35), a high-pressure discharge lamp with a sealed structure resulting from the air-tight sealing of tungsten electrodes 550 in quartz glass through the intermediary of quartz glass layers 599, which are obtained by the dispersion and distribution of thin tungsten films.

Although in FIG. 36 sputtering was performed under a stream of argon gas, it is also possible to perform sputtering while keeping argon gas sealed at a prescribed pressure or to add a stream of oxygen gas and perform oxidative sputtering. It is also possible to further perform thermal oxidation, plasma oxidation, or another oxidation treatment after the thin tungsten films 590 have been formed, yielding oxidized tungsten films.

It is further possible to use tungsten electrodes whose tips have been oxidized, or to use sputtering electrodes made of molybdenum and to replace the step for forming thin tungsten films with a step for forming thin molybdenum films or with a step for forming multilayer films consisting of these films.

Figure 38:
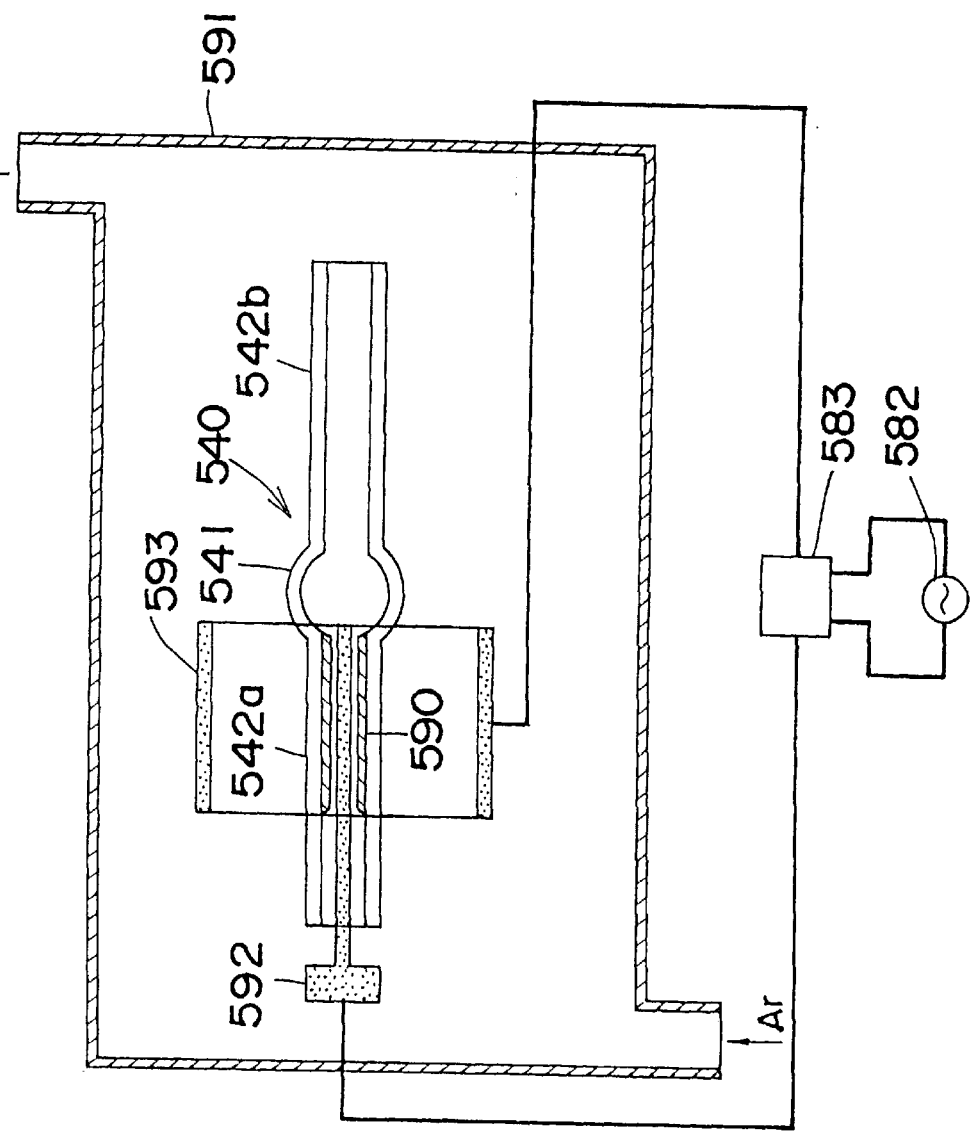
FIG. 38 is a diagram showing another sputtering apparatus of Embodiment 6 of the present invention.

The present embodiment was described with reference to cases in which sputtering was performed by introducing a pair of sputtering electrodes 580*a* and 580*b* into the lateral tubular component 542*a* or 542*b*, but, as shown in FIG. 38, it is also possible to introduce a narrow cylindrical sputtering electrode 592 into the lateral tubular component 542*a* (or 542*b*), to position a cylindrical sputtering electrode 593 around the outside of the lateral tubular component 542*a* (or 542*b*) with the sputtering electrode as the central axis, and to perform sputtering in an argon-replaced vacuum chamber 591, yielding a thin tungsten film 590.

Examples of manufacturing methods other than sputtering include thermal CVD, plasma CVD, and vacuum vapor deposition. Even with film-forming steps thus modified, the sealed structure of the ultimately obtained lamp exhibits excellent air-tightness and resistance to high pressure.

Although Embodiments 5 and 6 were described with reference to a lamp manufacturing method in which the electrically conductive metal structures for supplying electric current to the discharge arc were made of the tungsten electrodes 550 alone, it is also possible to manufacture lamps by the same method when the electrically conductive metal structures are made of the tungsten electrodes (102 in FIG. 39; 510 in FIG. 28(*b*)), molybdenum foil (103 in FIG. 39; 511 in FIG. 28(*b*)), and lead wires for introducing outside current (104 in FIG. 39; 512 in FIG. 28(*b*)) seen in the conventional sealed foil structures in FIGS. 39 and 28(*b*).

In addition, lamps in which not only mercury but also metal halides are sealed in the same manner can be manufactured by the same manufacturing method. Conversely, lamps devoid of mercury, such as xenon discharge lamps, can be manufactured by the same manufacturing method, with no restrictions imposed on the type of substance sealed.

In the Embodiments 3–6, the electrically conductive metal structures are described as made of tungsten bars, but each bar can be made of any other materials, such as a metallic bar formed by solding a tungsten bar and a molybdenum bar together.

Preferred embodiments of the present invention have been described above, and it is apparent that this description is not a limiting factor and allows a variety of modifications to be made. As described in these embodiments, the method for manufacturing and lighting high-pressure discharge lamps in accordance with the present invention serves as an illustration, with the scope of the present invention being defined in the claims.

Thus, the present invention provides a sealed structure for a high-pressure discharge lamp that has excellent adhesiveness and resistance to high pressure and that can withstand increases in lamp output, and allows high-pressure discharge lamps having such sealed structures to be manufactured.

What is claimed is:

1. A method for manufacturing a high-pressure discharge lamp, said method comprising:

preparing an outer tube made of a high-melting vitreous material, the outer tube comprising a glass housing with tubular components extending from the glass housing, and electrically conductive metal structures operable to supply electric current for forming a discharge arc in the glass housing;

introducing the electrically conductive metal structures into the tubular components such that one end of each of the electrically conductive metal structures is disposed inside the glass housing;

applying at least one type of a metal material selected from metals or oxides of the metals between the electrically conductive metal structures and inner surfaces of the tubular components; and heating and collapsing the tubular components to airtightly seal the electrically conductive metal structures.

2. A method according to claim 1, wherein said applying of the at least one type of metal material comprises applying a powder to the inner surfaces of the tubular components.

3. A method according to claim 2, wherein said applying of the powder to the inner surfaces of the tubular components comprises applying an organic binder solution comprising an $SiO_2$ powder mixed with a powder of the at least one type of metal material to the inner surfaces of the tubular components, and heat-treating the outer tube having the tubular components.

4. A method according to claim 1, wherein said applying of the at least one type of metal material comprises applying a powder of the at least one type of metal material to the electrically conductive metal structures.

5. A method according to claim 1, wherein said applying of the at least one type of metal material comprises forming thin films of the at least one type of metal material on the inner surfaces of the tubular components.

6. A method according to claim 5, wherein said forming of the thin films of the at least one type of metal material on the inner surfaces of the tubular components comprises introducing a pair of electrodes made of the at least one type of metal material into the tubular components, and supplying high-frequency power between the pair of electrodes to create a glow discharge and to form thin sputtered films.

7. A method according to claim 5, wherein said forming of the thin films of the at least one type of metal material on the inner surfaces of the tubular components comprises introducing electrodes obtained by placing the at least one type of metal material on a pair of metal tips into the tubular components, and supplying high-frequency power between the electrodes to create a glow discharge and to form thin sputtered films.

8. A method according to claim 5, wherein said forming of the thin films of the at least one type of metal material on the inner surfaces of the tubular components is such that a pair of electrodes comprising the at least one type of metal material are introduced into the tubular components, high-frequency power is supplied between the pair of electrodes, a glow discharge is created, and thin sputtered films are first formed and then oxidized, yielding oxidized films.

9. A method according to claim 1, wherein said applying of the at least one type of metal material comprises forming thin films of the at least one type of metal material on the electrically conductive metal structures.

10. A method according to claim 1, wherein said applying of the at least one type of metal material comprises:

preparing a glass powder and tubular structures made of a vitreous material whose melting point is lower than a melting point of the outer tube;

enclosing the electrically conductive metal structures within the tubular structures; and packing the glass powder in gaps between the electrically conductive metal structures and the tubular structures.

11. A method according to claim 10, further comprising compression molding the glass powder.

* * * * *